(12) United States Patent
Maksymov et al.

(10) Patent No.: US 12,229,603 B2
(45) Date of Patent: Feb. 18, 2025

(54) OPTIMAL CALIBRATION OF GATES IN A QUANTUM COMPUTING SYSTEM

(71) Applicants: IONQ, INC., College Park, MD (US); University of Maryland, College Park, MD (US)

(72) Inventors: Andrii Maksymov, Hyattsville, MD (US); Pradeep Niroula, College Park, MD (US); Yunseong Nam, North Bethesda, MD (US)

(73) Assignees: IONQ, INC., College Park, MD (US); UNIVERSITY OF MARYLAND, College Park, MD (US)

( * ) Notice: Subject to any disclaimer, the term of this patent is extended or adjusted under 35 U.S.C. 154(b) by 664 days.

(21) Appl. No.: 17/531,520

(22) Filed: Nov. 19, 2021

(65) Prior Publication Data
US 2022/0206866 A1    Jun. 30, 2022

Related U.S. Application Data

(60) Provisional application No. 63/132,954, filed on Dec. 31, 2020.

(51) Int. Cl.
*G06F 9/50*   (2006.01)
*G06N 10/20*  (2022.01)
*G06N 10/40*  (2022.01)

(52) U.S. Cl.
CPC ........... *G06F 9/5066* (2013.01); *G06N 10/20* (2022.01); *G06N 10/40* (2022.01)

(58) Field of Classification Search
None
See application file for complete search history.

(56) References Cited

U.S. PATENT DOCUMENTS

| | | | |
|---|---|---|---|
| 8,510,618 B1* | 8/2013 | Pesetski | B82Y 10/00 |
| | | | 714/746 |
| 2018/0260730 A1* | 9/2018 | Reagor | G06F 15/76 |

(Continued)

OTHER PUBLICATIONS

M. Ahsan, B.-S. Choi and J. Kim, "Performance simulator based on hardware resources constraints for ion trap quantum computer," 2013 IEEE 31st International Conference on Computer Design (ICCD), Asheville, NC, USA, 2013, pp. 411-418, (Year: 2013).*

(Continued)

*Primary Examiner* — Daniel F. McMahon
(74) *Attorney, Agent, or Firm* — Patterson + Sheridan, LLP

(57) ABSTRACT

A method of performing a quantum computation process includes mapping logical qubits to physical qubits of a quantum processor so that quantum circuits are executable using the physical qubits of the quantum processor and a total infidelity of the plurality of quantum circuits is minimized, wherein each of the physical qubits comprise a trapped ion, and each of the plurality of quantum circuits comprises single-qubit gates and two-qubit gates within the plurality of the logical qubits, calibrating two-qubit gates within a first plurality of pairs of physical qubits, such that infidelity of the two-qubit gates within the first plurality of pairs of physical qubit is lowered, executing the plurality of quantum circuits on the quantum processor, by applying laser pulses that each cause a single-qubit gate operation and a two-qubit gate operation in each of the plurality of quantum circuits on the plurality of physical qubits, measuring population of qubit states of the physical qubits in the quantum processor, and outputting the measured population of qubit states of the physical qubits.

20 Claims, 14 Drawing Sheets

(56) References Cited

U.S. PATENT DOCUMENTS

| | | | |
|---|---|---|---|
| 2020/0125985 A1 | 4/2020 | Narang et al. | |
| 2020/0369517 A1 | 11/2020 | Nam et al. | |
| 2021/0296558 A1* | 9/2021 | Englund | H10N 39/00 |
| 2022/0067565 A1* | 3/2022 | Blumel | G06E 1/00 |
| 2022/0101166 A1* | 3/2022 | Blumel | G06N 10/00 |
| 2022/0156630 A1* | 5/2022 | Schuster | H10N 69/00 |
| 2022/0172095 A1* | 6/2022 | Li | G06N 10/40 |

OTHER PUBLICATIONS

Maslov, Basic circuit compilation techniques for an ion-trap quantum machine, Feb. 22, 2017, New J. Phys. 19, 023035 (2017) (Year: 2017).*

R. Blumel, N. Grzesiak, and Y. Nam, Power-optimal, stabilized entangling gate between trapped-ion qubits, arXiv:1905.09292 (2019).

N. M. Linke, D. Maslov, M. Roetteler, S. Debnath, C. Figgatt, K. A. Landsman, K. Wright, and C. Monroe, Experimental comparison of two quantum computing architectures, Proceedings of the National Academy of Sciences, 114 (2017), p. 3305-3310.

C. McCreesh, P. Prosser, and J. Trimble, A Partitioning Algorithm for Maximum Common Subgraph Problems, in Proceedings of the Twenty-Sixth International Joint Conference on Artificial Intelligence, Melbourne, Australia, Aug. 2017, International Joint Conferences on Artificial Intelligence Organization, pp. 712-719.

Y. Nam, J.-S. Chen, N. C. Pisenti, K. Wright, C. Delaney, D. Maslov, K. R. Brown, S. Allen, J. M. Amini, J. Apisdorf, A.Beck, Kristin M. Blinov, V. Chaplin, M. Chmielewski, C. Collins, S. Debnath, A. M. Ducore, K. M. Hudek, M. Keesan, S. M. Kreikemeier, J. Mizrahi, P. Solomon, M. Williams, J. D. Wong-Campos, C. Monroe, and J. Kim, Ground-state energy estimation of the water molecule on a trapped-ion quantum computer, npj Quantum Information, 6 (2020), pp. 1-6.

Y. Nam and D. Maslov, Low-cost quantum circuits for classically intractable instances of the hamiltonian dynamics simulation problem, npj Quantum Information, 5 (2019).

J. Trimble, C. McCreesh, and P. Prosser, Three new approaches for the maximum common edge subgraph problem, In Doctoral Program Proceedings, Lille, France, Aug. 2018, International Conference on Principles and Practice of Constraint Programming, pp. 52-61.

K. Wright, K. Beck, S. Debnath, J. Amini, Y. Nam, N. Grzesiak, J.-S. Chen, N. Pisenti, M. Chmielewski, C. Collins, et al., Benchmarking an 11-qubit quantum computer, Nature communications, 10 (2019), pp. 16.

E. Farhi, J. Goldstone, and S. Gutmann, A quantum approximate optimization algorithm, arXiv:1411.4028, (2014).

N. Grzesiak, R. Blumel, K. Wright, K. M. Beck, N. C. Pisenti, M. Li, V. Chaplin, J. M. Amini, S. Debnath, J.-S. Chen, and et al., Efficient arbitrary simultaneously entangling gates on a trapped-ion quantum computer, Nature Communications, 11 (2020).

International Search Report dtd Jun. 24, 2022 for Application No. PCT/US2021/065569.

Japanese Application No. 2023-565340, Office Action dated Aug. 27, 2024, 10 pages.

* cited by examiner

OPTIMAL CALIBRATION OF GATES IN A QUANTUM COMPUTING SYSTEM

CROSS-REFERENCE TO RELATED APPLICATIONS

This application claims the benefit of the U.S. Provisional Patent Application Ser. No. 63/132,954, filed on Dec. 31, 2020, which is incorporated by reference herein.

GOVERNMENT LICENSE RIGHTS

This invention was made with Government support under 70NANB16H168 awarded by the National Institute of Standards and Technology. The Government has certain rights in the invention.

BACKGROUND

Field

The present disclosure generally relates to a method of performing computation in a quantum computing system, and more specifically, to a method of optimizing resource for calibrating quantum gate operations to execute a series of quantum gate operations in a quantum computing system that includes a group of trapped ions.

Description of the Related Art

Among physical systems upon which it is proposed to build large-scale quantum computers, is a group of ions (e.g., charged atoms), which are trapped and suspended in vacuum by electromagnetic fields. The ions have internal hyperfine states which are separated by frequencies in the several GHz range and can be used as the computational states of a qubit (referred to as "qubit states"). These hyperfine states can be controlled using radiation provided from a laser, or sometimes referred to herein as the interaction with laser beams. The ions can be cooled to near their motional ground states using such laser interactions. The ions can also be optically pumped to one of the two hyperfine states with high accuracy (preparation of qubits), manipulated between the two hyperfine states (single-qubit gate operations) by laser beams, and their internal hyperfine states detected by fluorescence upon application of a resonant laser beam (read-out of qubits). A pair of ions can be controllably entangled (two-qubit gate operations) by qubit-state dependent force using laser pulses that couple the ions to the collective motional modes of a group of trapped ions, which arise from their Coulombic interaction between the ions. In general, entanglement occurs when pairs or groups of ions (or particles) are generated, interact, or share spatial proximity in ways such that the quantum state of each ion cannot be described independently of the quantum state of the others, even when the ions are separated by a large distance.

Quantum computation can be performed by executing a set of single-qubit gate operations and two-qubit gate operations in such a quantum computing system. Although the methods for applying these basic building blocks of quantum computation have been established, there are control errors that result from m is-calibration of control parameters, such as a frequency or an amplitude of a laser pulse to be applied to a qubit, in hardware in the quantum computing system. These control errors are mainly due to the lack of knowledge about how the ions will interact and the properties of quantum computing hardware within the quantum computing system. Thus, the control parameters in the quantum computing system need to be corrected (i.e., calibrated) to perform reliable and scalable quantum computation. However, calibration typically requires repeated measurements of qubits to collect statistics over a sizable parameter space of the control parameters of the quantum computing system. Thus, calibration can be an expensive and time-consuming task.

Therefore, there is a need for a method of minimizing resource for calibrating control parameters within an acceptable error in quantum computation.

SUMMARY

Embodiments of the present disclosure provide a method of performing a quantum computation process. The method includes mapping, by a classical computer, a plurality of logical qubits to a plurality of physical qubits of a quantum processor so that a plurality of quantum circuits are executable using the physical qubits of the quantum processor and a total infidelity of the plurality of quantum circuits is minimized, wherein each of the physical qubits comprise a trapped ion, and each of the plurality of quantum circuits comprises a plurality of single-qubit gates and a plurality of two-qubit gates within the plurality of the logical qubits, calibrating, by a system controller, two-qubit gates within a first plurality of pairs of physical qubits, such that infidelity of the two-qubit gates within the first plurality of pairs of physical qubit is lowered, executing the plurality of quantum circuits on the quantum processor, by applying laser pulses that each cause a single-qubit gate operation and a two-qubit gate operation in each of the plurality of quantum circuits on the plurality of physical qubits, measuring, by the system controller, population of qubit states of the physical qubits in the quantum processor after executing the plurality of quantum circuits on the quantum processor, and outputting, by the classical computer, the measured population of qubit states of the physical qubits as a result of the execution the plurality quantum circuits, wherein the result of the execution the plurality quantum circuits are configured to be displayed on a user interface, stored in a memory of the classical computer, or transferred to another computational device.

Embodiments of the present disclosure also provide a quantum computing system. The quantum computing system includes a quantum processor comprising a plurality of physical qubits, wherein each of the physical qubits comprises a trapped ion, a classical computer configured to map a plurality of logical qubits to the plurality of physical qubits so that a plurality of quantum circuits are executable using the physical qubits and a total infidelity of the plurality of quantum circuits is minimized, wherein each of the plurality of quantum circuits comprises a plurality of single-qubit gates and a plurality of two-qubit gates within the plurality of the logical qubits, and a system controller configured to calibrate two-qubit gates within a first plurality of pairs of physical qubits, such that infidelity of the two-qubit gates within the first plurality of pairs of physical qubit is lowered, executing the plurality of quantum circuits on the quantum processor, by applying laser pulses that each cause a single-qubit gate operation and a two-qubit gate operation in each of the plurality of quantum circuits on the plurality of physical qubits, and measure population of qubit states of the physical qubits in the quantum processor after executing the plurality of quantum circuits on the quantum processor, wherein the classical computer is further configured to output the measured population of qubit states of the physical qubits as a result of the execution the plurality quantum circuits, wherein the result of the execution the plurality quantum circuits are configured to be displayed on a user interface, stored in a memory of the classical computer, or transferred to another computational device.

Embodiments of the present disclosure further provide a quantum computing system comprising non-volatile memory having a number of instructions stored therein. The number of instructions, when executed by one or more processors, causes the quantum computing system to perform operations including mapping, by a classical computer, a plurality of logical qubits to a plurality of physical qubits of a quantum processor so that a plurality of quantum circuits are executable using the physical qubits of the quantum processor and a total infidelity of the plurality of quantum circuits is minimized, wherein each of the physical qubits comprise a trapped ion, and each of the plurality of quantum circuits comprises a plurality of single-qubit gates and a plurality of two-qubit gates within the plurality of the logical qubits, calibrating, by a system controller, two-qubit gates within a first plurality of pairs of physical qubits, such that infidelity of the two-qubit gates within the first plurality of pairs of physical qubit is lowered, executing the plurality of quantum circuits on the quantum processor, by applying laser pulses that each cause a single-qubit gate operation and a two-qubit gate operation in each of the plurality of quantum circuits on the plurality of physical qubits, measuring, by the system controller, population of qubit states of the physical qubits in the quantum processor after executing the plurality of quantum circuits on the quantum processor, and outputting, by the classical computer, the measured population of qubit states of the physical qubits as a result of the execution the plurality quantum circuits, wherein the result of the execution the plurality quantum circuits are configured to be displayed on a user interface, stored in a memory of the classical computer, or transferred to another computational device.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
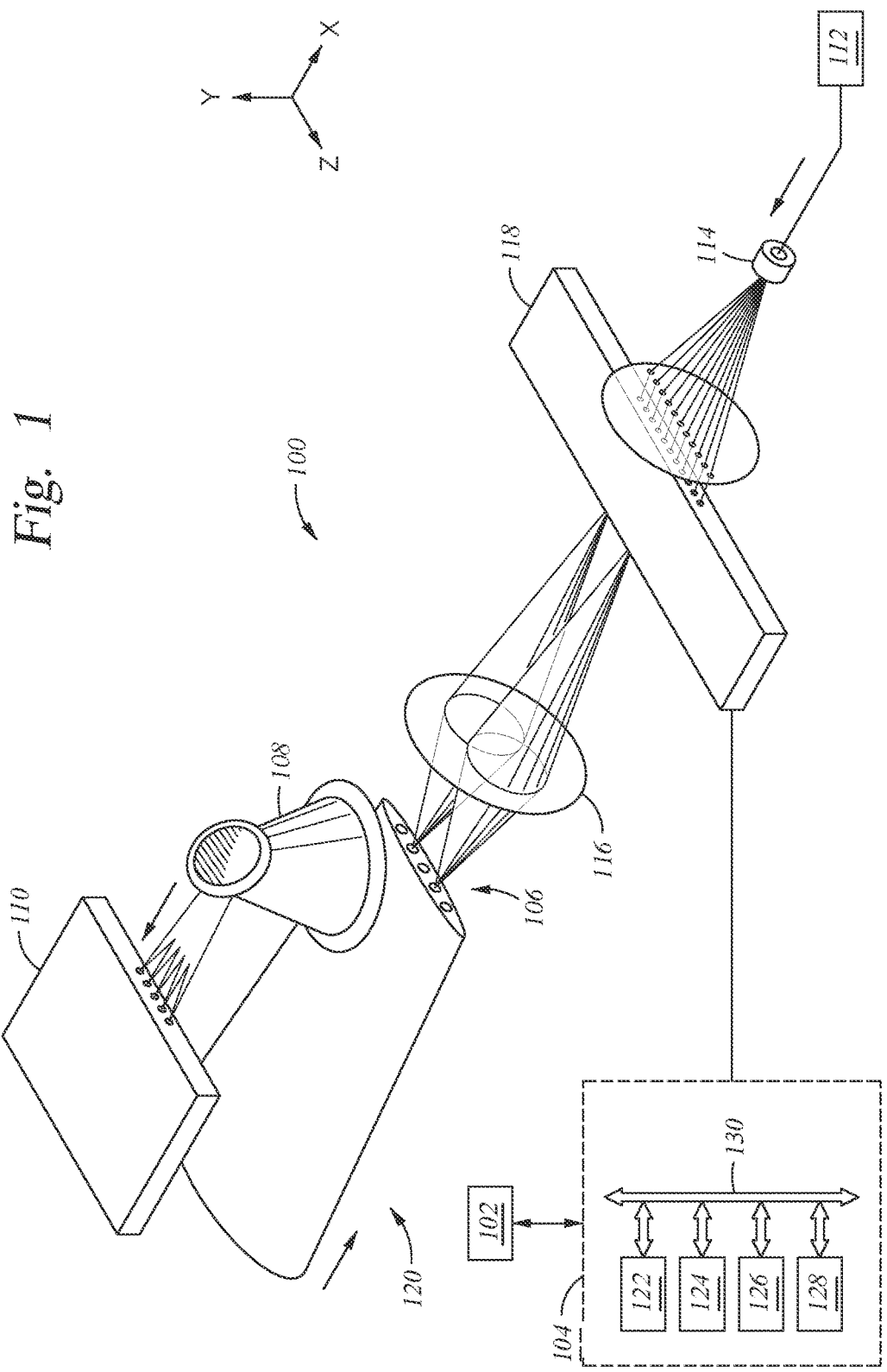
FIG. 1 is a schematic partial view of an ion trap quantum computing system according to one embodiment.

To facilitate understanding, identical reference numerals have been used, where possible, to designate identical elements that are common to the figures. In the figures and the following description, an orthogonal coordinate system including an X-axis, a Y-axis, and a Z-axis is used. The directions represented by the arrows in the drawing are assumed to be positive directions for convenience. It is contemplated that elements disclosed in some embodiments may be beneficially utilized on other implementations without specific recitation.

DETAILED DESCRIPTION

Embodiments described herein are generally related to a method of performing a computation in a quantum computing system, and more specifically, to a method of optimizing resources required to perform a series of quantum gate operations in a quantum computing system that includes a group of trapped ions. The method can include a process of calibrating aspects of the quantum gate operations used in the computational process performed by a quantum computing system.

Embodiments of the disclosure include a quantum computing system that is able to perform a quantum computation process by use of a classical computer, a system controller, and a quantum processor. The classical computer performs supporting tasks including selecting a quantum algorithm to be used, computing quantum circuits to run the quantum algorithm, and outputting results of the execution of the quantum circuits by use of a user interface. A software program for performing the tasks is stored in a non-volatile memory within the classical computer. The quantum processor includes trapped ions that are coupled with various hardware, including lasers to manipulate internal hyperfine states (qubit states) of the trapped ions and photomultiplier tubes (PMTs) to read-out the internal hyperfine states (qubit states) of the trapped ions. The system controller receives from the classical computer instructions for controlling the quantum processor, and controls various hardware associated with controlling any and all aspects used to run the instructions for controlling the quantum processor, and transmits a read-out of the quantum processor and thus output of results of the read-out to the classical computer. In some embodiments, the classical computer will then utilize the computational results based on the output of results of the read-out to form a results set that is then provided to a user the form of results displayed on a user interface, stored in a memory and/or transferred to another computational device for solving technical problems.

I. General Hardware Configurations

FIG. 1 is a schematic partial view of an ion trap quantum computing system according to one embodiment. The ion trap quantum computing system 100 includes a classical (digital) computer 102, a system controller 104 and a quantum processor that is a group 106 of trapped ions (i.e., five shown) that extend along the Z-axis. Each ion in the group 106 of trapped ions is an ion having a nuclear spin I and an electron spin S such that a difference between the nuclear spin I and the electron spin S is zero, such as a positive ytterbium ion, $^{171}$Yb$^+$, a positive barium ion $^{133}$Ba$^+$, a positive cadmium ion $^{111}$Cd$^+$ or $^{113}$Cd$^+$, which all have a nuclear spin I=½ and the $^2S_{1/2}$ hyperfine states. In some embodiments, all ions in the group 106 of trapped ions are the same species and isotope (e.g., $^{171}$Yb$^+$) In some other embodiments, the group 106 of trapped ions includes one or more species or isotopes (e.g., some ions are $^{171}$Yb$^+$ and some other ions are $^{133}$Ba$^+$). In yet additional embodiments, the group 106 of trapped ions may include various isotopes of the same species (e.g., different isotopes of Yb, different isotopes of Ba). The ions in the group 106 of trapped ions are individually addressed with separate laser beams. The classical computer 102 includes a central processing unit (CPU), memory, and support circuits (or I/O). The memory is connected to the CPU, and may be one or more of a readily available memory, such as a read-only memory (ROM), a random access memory (RAM), floppy disk, hard disk, or any other form of digital storage, local or remote. Software instructions, algorithms and data can be coded and stored within the memory for instructing the CPU. The support circuits (not shown) are also connected to the CPU for supporting the processor in a conventional manner. The support circuits may include conventional cache, power supplies, clock circuits, input/output circuitry, subsystems, and the like.

An imaging objective 108, such as an objective lens with a numerical aperture (NA), for example, of 0.37, collects fluorescence along the Y-axis from the ions and maps each ion onto a multi-channel photo-multiplier tube (PMT) 110 for measurement of individual ions. Non-copropagating Raman laser beams from a laser 112, which are provided along the X-axis, perform operations on the ions. A diffractive beam splitter 114 creates an array of static Raman beams 116 that are individually switched using a multi-channel acousto-optic modulator (AOM) 118 and is configured to selectively act on individual ions. A global Raman laser beam 120 is configured to illuminate all ions at once. In some embodiments, individual Raman laser beams (not shown) each illuminate individual ions. The system controller (also referred to as a "RF controller") 104 controls the AOM 118 and thus controls laser pulses to be applied to trapped ions in the group 106 of trapped ions. The system controller 104 includes a central processing unit (CPU) 122, a read-only memory (ROM) 124, a random access memory (RAM) 126, a storage unit 128, and the like. The CPU 122 is a processor of the system controller 104. The ROM 124 stores various programs and the RAM 126 is the working memory for various programs and data. The storage unit 128 includes a nonvolatile memory, such as a hard disk drive (HDD) or a flash memory, and stores various programs even if power is turned off. The CPU 122, the ROM 124, the RAM 126, and the storage unit 128 are interconnected via a bus 130. The system controller 104 executes a control program which is stored in the ROM 124 or the storage unit 128 and uses the RAM 126 as a working area. The control program will include software applications that include program code that may be executed by processor in order to perform various functionalities associated with receiving and analyzing data and controlling any and all aspects of the methods and hardware used to create the ion trap quantum computer system 100 discussed herein.

Figure 2:
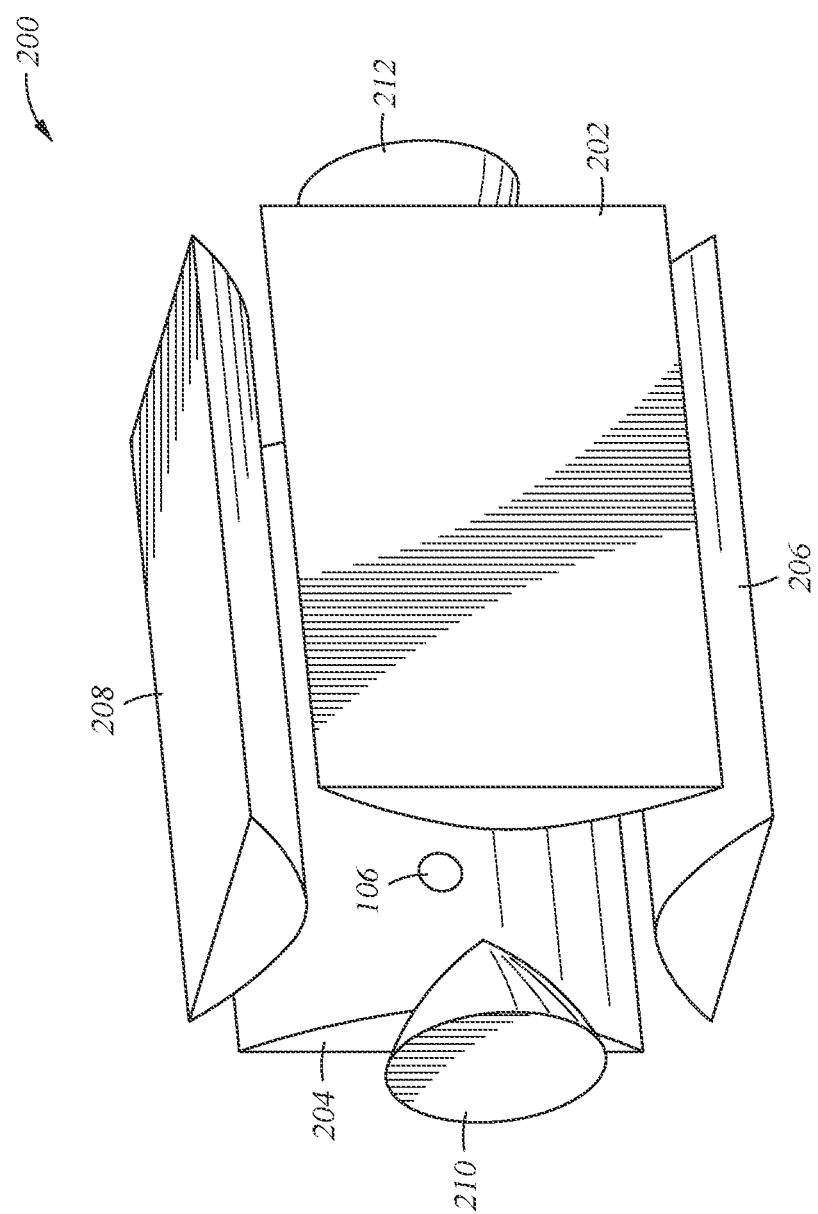
FIG. 2 depicts a schematic view of an ion trap for confining ions in a group according to one embodiment.

FIG. 2 depicts a schematic view of an ion trap 200 (also referred to as a Paul trap) for confining ions in the group 106 according to one embodiment. The confining potential is exerted by both static (DC) voltage and radio frequency (RF) voltages. A static (DC) voltage $V_S$ is applied to end-cap electrodes 210 and 212 to confine the ions along the Z-axis (also referred to as an "axial direction" or a "longitudinal direction"). The ions in the group 106 are nearly evenly distributed in the axial direction due to the Coulomb interaction between the ions. In some embodiments, the ion trap 200 includes four hyperbolically-shaped electrodes 202, 204, 206, and 208 extending along the Z-axis.

During operation, a sinusoidal voltage $V_1$ (with an amplitude $V_{RF}/2$) is applied to an opposing pair of the electrodes 202, 204 and a sinusoidal voltage $V_2$ with a phase shift of 180° from the sinusoidal voltage $V_1$ (and the amplitude $V_{RF}/2$) is applied to the other opposing pair of the electrodes 206, 208 at a driving frequency $\omega_{RF}$, generating a quadrupole potential. In some embodiments, a sinusoidal voltage is only applied to one opposing pair of the electrodes 202, 204, and the other opposing pair 206, 208 is grounded. The quadrupole potential creates an effective confining force in the X-Y plane perpendicular to the Z-axis (also referred to as a "radial direction" or "transverse direction") for each of the trapped ions, which is proportional to a distance from a saddle point (i.e., a position in the axial direction (Z-direction)) at which the RF electric field vanishes. The motion in the radial direction (i.e., direction in the X-Y plane) of each ion is approximated as a harmonic oscillation (referred to as secular motion) with a restoring force towards the saddle point in the radial direction and can be modeled by spring constants $k_x$, and $k_y$, respectively, as is discussed in greater detail below. In some embodiments, the spring constants in the radial direction are modeled as equal when the quadrupole potential is symmetric in the radial direction. However, undesirably in some cases, the motion of the ions in the radial direction may be distorted due to some asymmetry in the physical trap configuration, a small DC patch potential due to inhomogeneity of a surface of the electrodes, or the like and due to these and other external sources of distortion the ions may lie off-center from the saddle points.

Figure 3:
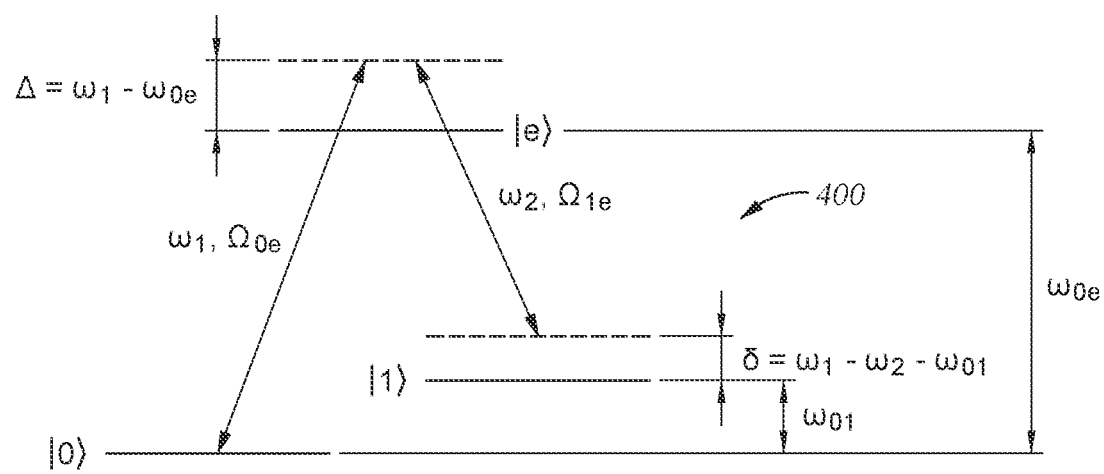
FIG. 3 depicts a schematic energy diagram of each ion in a group of trapped ions according to one embodiment.

FIG. 3 depicts a schematic energy diagram 300 of each ion in the group 106 of trapped ions according to one embodiment. Each ion in the group 106 of trapped ions is an ion having a nuclear spin I and an electron spin S such that a difference between the nuclear spin I and the electron spin S is zero. In one example, each ion may be a positive Ytterbium ion, $^{171}$Yb$^+$, which has a nuclear spin I=½ and the $^2S_{1/2}$ hyperfine states (i.e., two electronic states) with an energy split corresponding to a frequency difference (referred to as a "carrier frequency") of $\omega_{01}/2\pi=12.642821$ GHz. In other examples, each ion may be a positive barium ion $^{133}$Ba$^+$, a positive cadmium ion $^{111}$Cd$^+$ or $^{113}$Cd$^+$, which all have a nuclear spin I=½ and the $^2S_{1/2}$ hyperfine states. A qubit is formed with the two hyperfine states, denoted as |0⟩ and |1⟩, where the hyperfine ground state (i.e., the lower energy state of the $^2S_{1/2}$ hyperfine states) is chosen to represent |0⟩). Hereinafter, the terms "hyperfine states,"

"internal hyperfine states," and "qubits" may be interchangeably used to represent $|0\rangle$ and $|1\rangle$. Each ion may be cooled (i.e., kinetic energy of the ion may be reduced) to near the motional ground state $|0\rangle_m$ for any motional mode m with no phonon excitation (i.e., $n_{ph}=0$) by known laser cooling methods, such as Doppler cooling or resolved sideband cooling, and then the qubit state prepared in the hyperfine ground state $|0\rangle$ by optical pumping. Here, $|0\rangle$ represents the individual qubit state of a trapped ion whereas $|0\rangle_m$ with the subscript m denotes the motional ground state for a motional mode m of a group 106 of trapped ions.

An individual qubit state of each trapped ion may be manipulated by, for example, a mode-locked laser at 355 nanometers (nm) via the excited $^2P_{1/2}$ level (denoted as $|e\rangle$). As shown in FIG. 3, a laser beam from the laser may be split into a pair of non-copropagating laser beams (a first laser beam with frequency $\omega_1$ and a second laser beam with frequency $\omega_2$) in the Raman configuration, and detuned by a one-photon transition detuning frequency $\Delta=\omega_1-\omega_{0e}$ with respect to the transition frequency $\omega_{0e}$ between $|0\rangle$ and $|e\rangle$, as illustrated in FIG. 3. A two-photon transition detuning frequency $\delta$ includes adjusting the amount of energy that is provided to the trapped ion by the first and second laser beams, which when combined is used to cause the trapped ion to transfer between the hyperfine states $|0\rangle$ and $|1\rangle$. When the one-photon transition detuning frequency $\Delta$ is much larger than a two-photon transition detuning frequency (also referred to simply as "detuning frequency") $\delta=\omega_1-\omega_2-\omega_{01}$ (hereinafter denoted as $\pm\mu$, $\mu$ being a positive value), single-photon Rabi frequencies $\Omega_{0e}(t)$ and $\Omega_{1e}(t)$ (which are time-dependent, and are determined by amplitudes and phases of the first and second laser beams), at which Rabi flopping between states $|0\rangle$ and $|e\rangle$ and between states $|1\rangle$ and $|e\rangle$ respectively occur, and a spontaneous emission rate from the excited state $|e\rangle$, Rabi flopping between the two hyperfine states $|0\rangle$ and $|1\rangle$ (referred to as a "carrier transition") is induced at the two-photon Rabi frequency $\Omega(t)$. The two-photon Rabi frequency $\Omega(t)$ has an intensity (i.e., absolute value of amplitude) that is proportional to $\Omega_{0e}\Omega_{1e}/2\Delta$, where $\Omega_{0e}$ and $\Omega_{1e}$ are the single-photon Rabi frequencies due to the first and second laser beams, respectively. Hereinafter, this set of non-propagating laser beams in the Raman configuration to manipulate internal hyperfine states of qubits (qubit states) may be referred to as a "composite pulse" or simply as a "pulse," and the resulting time-dependent pattern of the two-photon Rabi frequency $\Omega(t)$ may be referred to as an "amplitude" of a pulse or simply as a "pulse," which are illustrated and further described below. The detuning frequency $\delta=\omega_1-\omega_2-\omega_1$ may be referred to as detuning frequency of the composite pulse or detuning frequency of the pulse. The amplitude of the two-photon Rabi frequency $\Omega(t)$, which is determined by amplitudes of the first and second laser beams, may be referred to as an "amplitude" of the composite pulse.

It should be noted that the particular atomic species used in the discussion provided herein is just one example of atomic species which have stable and well-defined two-level energy structures when ionized and an excited state that is optically accessible, and thus is not intended to limit the possible configurations, specifications, or the like of an ion trap quantum computer according to the present disclosure. For example, other ion species include alkaline earth metal ions (Be$^+$, Ca$^+$, Sr$^+$, Mg+, and Ba$^+$) or transition metal ions (Zn$^+$, Hg$^+$, Cd$^+$).

Figure 4:
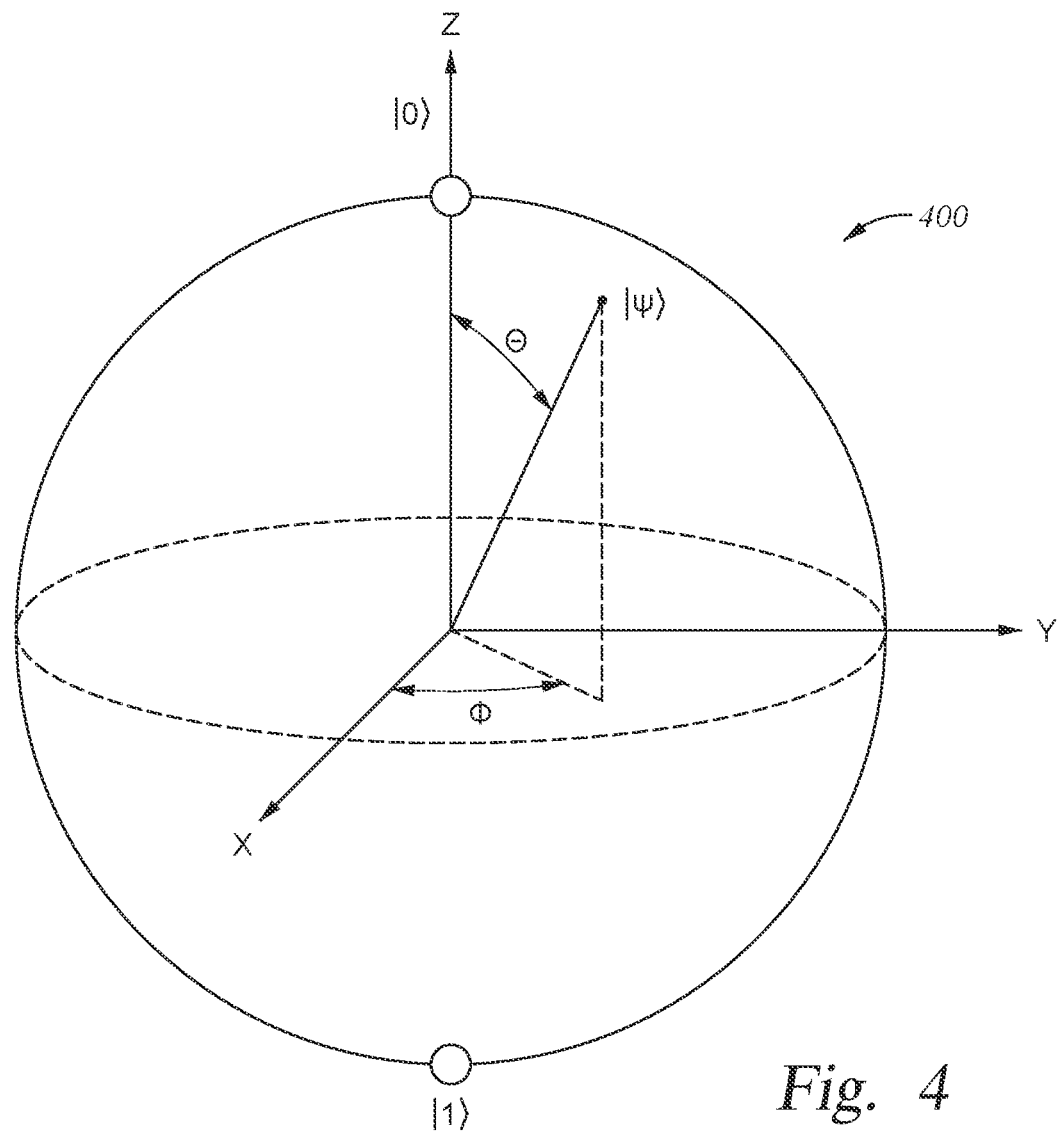
FIG. 4 depicts a qubit state of an ion represented as a point on a surface of the Bloch sphere.

FIG. 4 is provided to help visualize a qubit state of an ion is represented as a point on a surface of the Bloch sphere 400 with an azimuthal angle $\phi$ and a polar angle $\theta$. Application of the composite pulse as described above, causes Rabi flopping between the qubit state $|0\rangle$ (represented as the north pole of the Bloch sphere) and $|1\rangle$ (the south pole of the Bloch sphere) to occur. Adjusting time duration and amplitudes of the composite pulse flips the qubit state from $|0\rangle$ to $|1\rangle$ (i.e., from the north pole to the south pole of the Bloch sphere), or the qubit state from $|1\rangle$ to $|0\rangle$ (i.e., from the south pole to the north pole of the Bloch sphere). This application of the composite pulse is referred to as a "π-pulse". Further, by adjusting time duration and amplitudes of the composite pulse, the qubit state $|0\rangle$ may be transformed to a superposition state $|0\rangle+|1\rangle$, where the two qubit states $|0\rangle$ and $|1\rangle$ are added and equally-weighted in-phase (a normalization factor of the superposition state is omitted hereinafter for convenience) and the qubit state $|1\rangle$ to a superposition state $|0\rangle-|1\rangle$, where the two qubit states $|0\rangle$ and $|1\rangle$ are added equally-weighted but out of phase. This application of the composite pulse is referred to as a "π/2-pulse". More generally, a superposition of the two qubits states $|0\rangle$ and $|1\rangle$ that are added and equally-weighted is represented by a point that lies on the equator of the Bloch sphere. For example, the superposition states $|0\rangle\pm|1\rangle$ correspond to points on the equator with the azimuthal angle $\phi$ being zero and π, respectively. The superposition states that correspond to points on the equator with the azimuthal angle $\phi$ are denoted as $|0\rangle+e^{i\phi}|1\rangle$ (e.g., $|0\rangle\pm i|1\rangle$ for $\phi=\pm\pi/2$). Transformation between two points on the equator (i.e., a rotation about the Z-axis on the Bloch sphere) can be implemented by shifting phases of the composite pulse.

II. Entanglement Formation

Figure 5A:
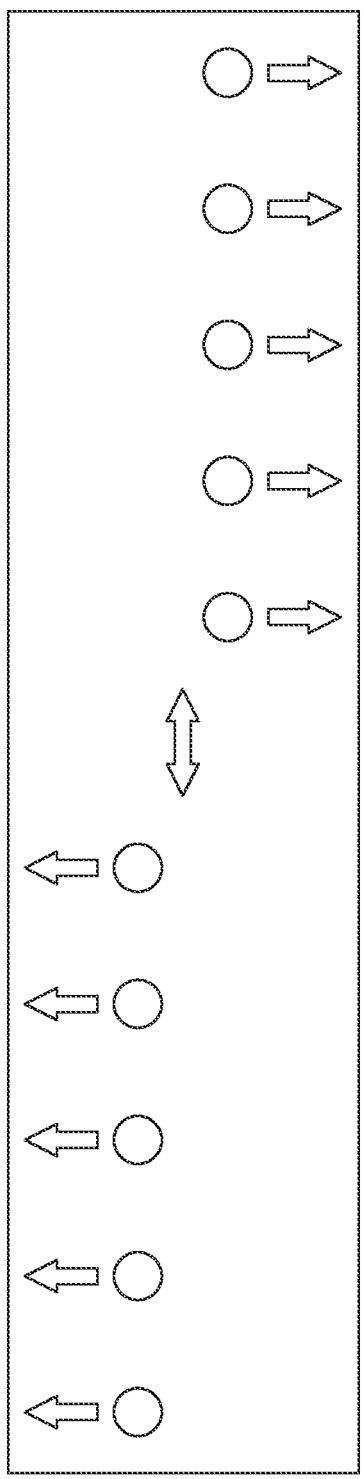
FIGS. 5A, 5B, and 5C depict a few schematic collective transverse motional mode structures of a group of five trapped ions.
Figure 5B:
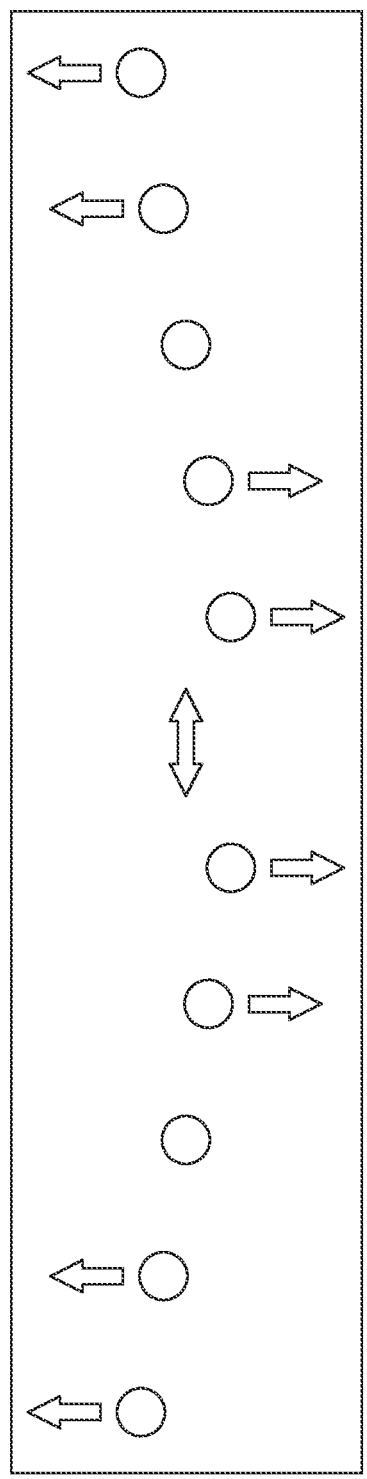
Figure 5C:
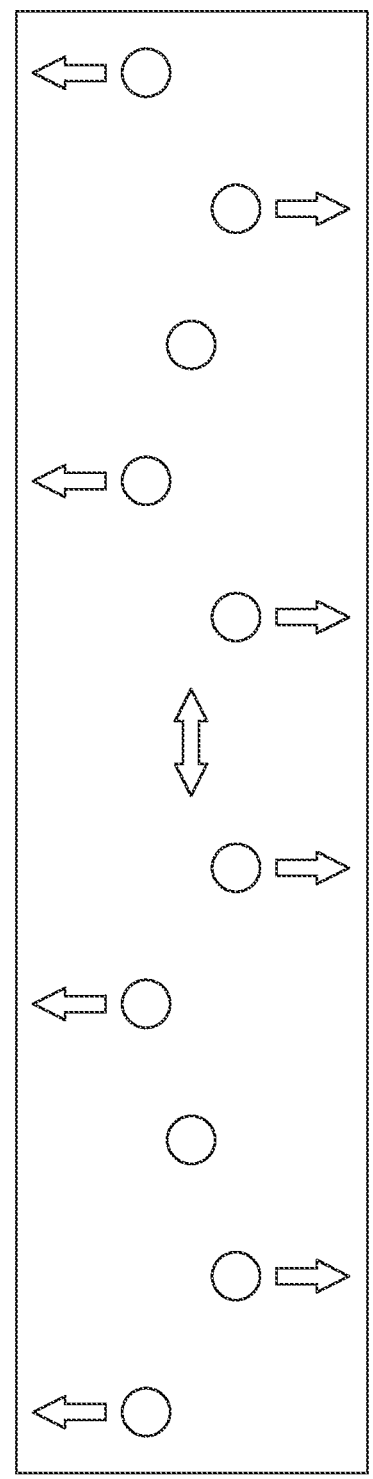

FIGS. 5A, 5B, and 5C depict a few schematic structures of collective transverse motional modes (also referred to simply as "motional mode structures") of a group 106 of five trapped ions, for example. Here, the confining potential due to a static voltage $V_s$ applied to the end-cap electrodes 210 and 212 is weaker compared to the confining potential in the radial direction. The collective motional modes of the group 106 of trapped ions in the transverse direction are determined by the Coulomb interaction between the trapped ions combined with the confining potentials generated by the ion trap 200. The trapped ions undergo collective transversal motions (referred to as "collective transverse motional modes," "collective motional modes," or simply "motional modes"), where each mode has a distinct energy (or equivalently, a frequency) associated with it. A motional mode having the m-th lowest energy is hereinafter referred to as $|n_{ph}\rangle_m$, where $n_{ph}$ denotes the number of motional quanta (in units of energy excitation, referred to as phonons) in the motional mode, and the number of motional modes M in a given transverse direction is equal to the number of trapped ions in the group 106. FIGS. 5A-5C schematically illustrates examples of different types of collective transverse motional modes that may be experienced by five trapped ions that are positioned in a group 106. FIG. 5A is a schematic view of a common motional mode $|n_{ph}\rangle_M$, having the highest energy, where M is the number of motional modes. In the common motional mode $|n\rangle_M$, all ions oscillate in phase in the transverse direction. FIG. 5B is a schematic view of a tilt motional mode $|n_{ph}\rangle_{M-1}$ which has the second highest energy. In the tilt motional mode, ions on opposite ends move out of phase in the transverse direction (i.e., in opposite directions). FIG. 5C is a schematic view of a higher-order motional mode $|n_{ph}\rangle_{M-3}$ which has a lower energy than that of the tilt motional mode $|n_{ph}\rangle_{M-1}$, and in which the ions move in a more complicated mode pattern.

It should be noted that the particular configuration described above is just one among several possible examples of a trap for confining ions according to the present disclosure and does not limit the possible configurations, specifications, or the like of traps according to the present disclosure. For example, the geometry of the electrodes is not limited to the hyperbolic electrodes described above. In other examples, a trap that generates an effective electric field causing the motion of the ions in the radial direction as harmonic oscillations may be a multi-layer trap in which several electrode layers are stacked and an RF voltage is applied to two diagonally opposite electrodes, or a surface trap in which all electrodes are located in a single plane on a chip. Furthermore, a trap may be divided into multiple segments, adjacent pairs of which may be linked by shuttling one or more ions, or coupled by photon interconnects. A trap may also be an array of individual trapping regions arranged closely to each other on a micro-fabricated ion trap chip. In some embodiments, the quadrupole potential has a spatially varying DC component in addition to the RF component described above.

Figure 6A:
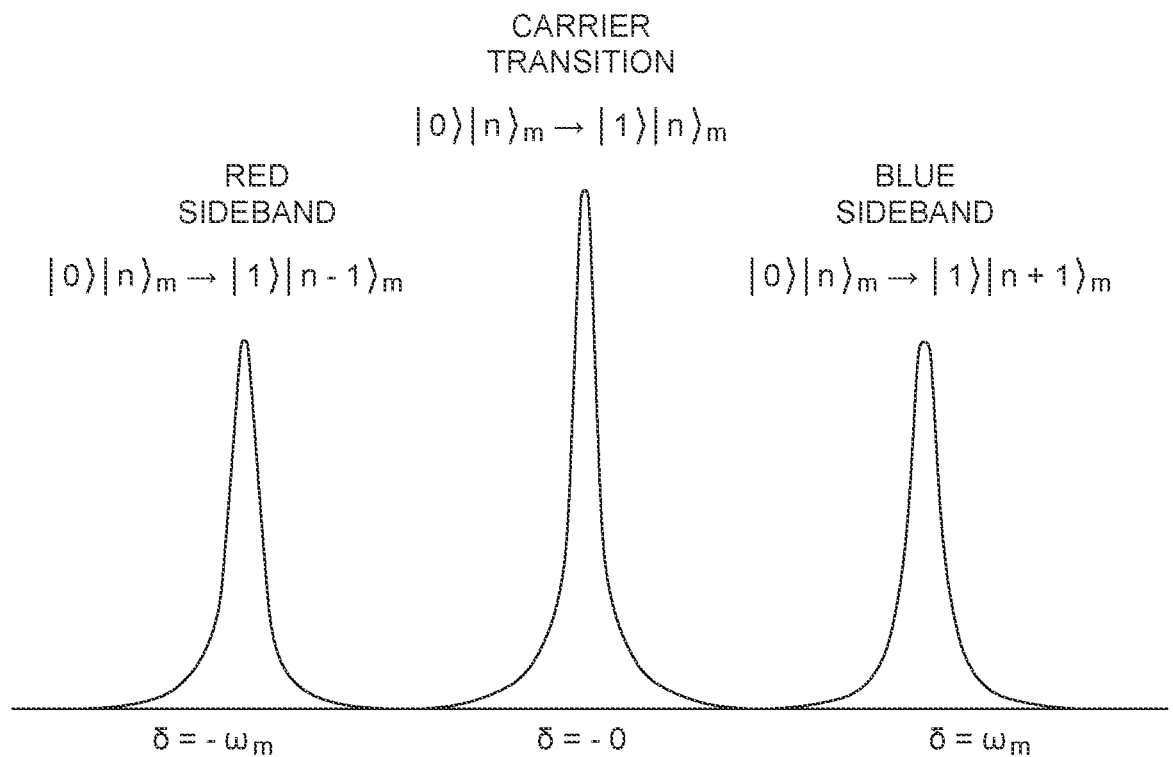
FIGS. 6A and 6B depict schematic views of motional sideband spectrum of each ion and a motional mode according to one embodiment.
Figure 6B:
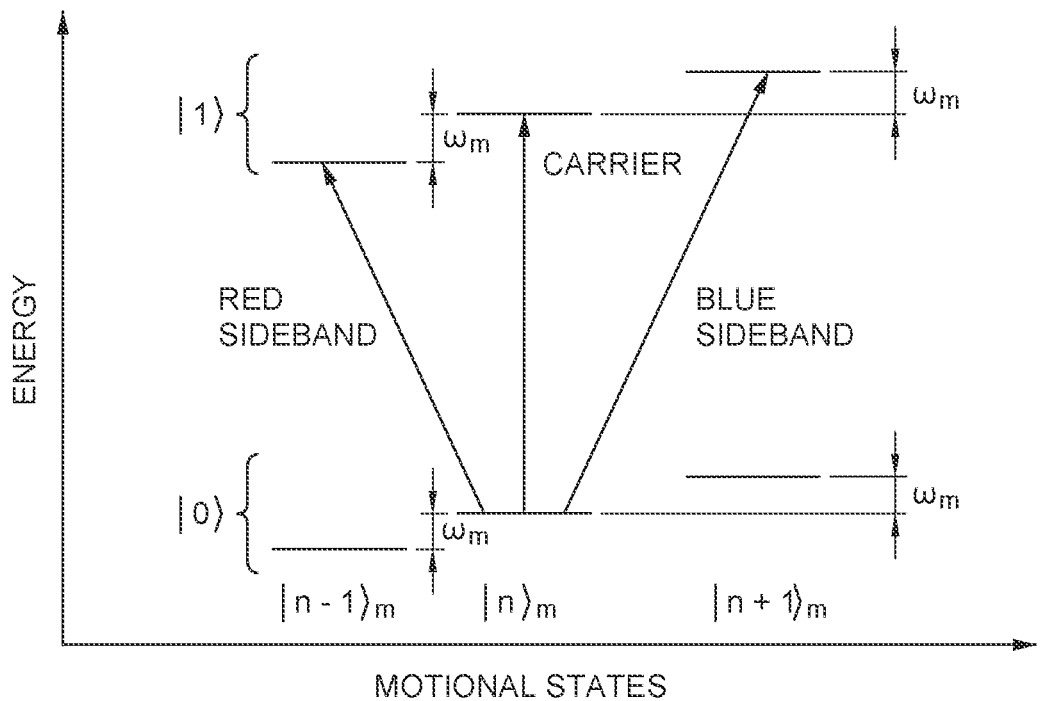

In an ion trap quantum computer, the motional modes may act as a data bus to mediate entanglement between two qubits and this entanglement is used to perform an XX gate operation. That is, each of the two qubits is entangled with the motional modes, and then the entanglement is transferred to an entanglement between the two qubits by using motional sideband excitations, as described below. FIGS. 6A and 6B schematically depict views of a motional sideband spectrum for an ion in the group 106 in a motional mode $|n_{ph}\rangle_M$ having frequency $\omega_m$ according to one embodiment. As illustrated in FIG. 6B, when the detuning frequency of the composite pulse is zero (i.e., a frequency difference between the first and second laser beams is tuned to the carrier frequency, $\delta=\omega_1-\omega_2-\omega_{01}=0$), simple Rabi flopping between the qubit states $|0\rangle$ and $|1\rangle$ (carrier transition) occurs. When the detuning frequency of the composite pulse is positive (i.e., the frequency difference between the first and second laser beams is tuned higher than the carrier frequency, $\delta=\omega_1-\omega_2-\omega_{01}=\mu>0$, referred to as a blue sideband), Rabi flopping between combined qubit-motional states $|0\rangle|n_{ph}\rangle_m$ and $|1\rangle n_{ph}+\rangle_n$ occurs (i.e., a transition from the m-th motional mode with n-phonon excitations denoted by $|n_{ph}\rangle_m$ to the m-th motional mode with $(n_{ph}+1)$-phonon excitations denoted by $|n_{ph}+1\rangle_m$ occurs when the qubit state $|0\rangle$ flips to $|1\rangle$). When the detuning frequency of the composite pulse is negative (i.e., the frequency difference between the first and second laser beams is tuned lower than the carrier frequency by the frequency $\omega_m$ of the motional mode $|n_{ph}\rangle_m$, $\delta=\omega_1-\omega_2-\omega_{01}=-\mu<0$, referred to as a red sideband), Rabi flopping between combined qubit-motional states $|0\rangle)|n_{ph}\rangle_m$ and $|1\rangle n_{ph}-1\rangle_m$ occurs (i.e., a transition from the motional mode $|n_{ph}\rangle_m$ to the motional mode $|n_{ph}-1\rangle_m$ with one less phonon excitations occurs when the qubit state $|0\rangle$ flips to $|1\rangle$. A $\pi/2$-pulse on the blue sideband applied to a qubit transforms the combined qubit-motional state $|0\rangle n_{ph}\rangle_m$ into a superposition of $|0\rangle|n_{ph}\rangle_m$ and $|1\rangle n_{ph}+1\rangle_m$. A $\pi/2$-pulse on the red sideband applied to a qubit transforms the combined qubit-motional $|0\rangle|n_{ph}\rangle_m$ into a superposition of $|0\rangle|n_{ph}\rangle_m$ and $|1\rangle|n_{ph}-1\rangle_m$. When the two-photon Rabi frequency $\Omega(\tau)$ is smaller as compared to the detuning frequency $\delta=\omega_1-\omega_2\omega_{\omega 01}=\pm\mu$, the blue sideband transition or the red sideband transition may be selectively driven. Thus, a qubit can be entangled with a desired motional mode by applying the right type of pulse, such as a $\pi/2$-pulse, which can be subsequently entangled with another qubit, leading to an entanglement between the two qubits that is needed to perform an XX-gate operation in an ion trap quantum computer.

By controlling and/or directing transformations of the combined qubit-motional states as described above, an X)(-gate operation may be performed on two qubits (i-th and j-th qubits). In general, the XX-gate operation (with maximal entanglement) respectively transforms two-qubit states $|0\rangle_i|0\rangle_j$, $|0\rangle_i|1\rangle_j$, $|1\rangle_i|0\rangle_j$, and $|1\rangle_i|1\rangle_j$ as follows:

$|0\rangle_i|0\rangle_j \rightarrow |0\rangle_i|0\rangle_j - i|1\rangle_i|1\rangle_j$ $|0\rangle_i|1\rangle_j \rightarrow |0\rangle_i|1\rangle_j - i|1\rangle_i|0\rangle_j$ $|1\rangle_i|0\rangle_j \rightarrow -i|0\rangle_i|1\rangle_j + |1\rangle_i|0\rangle_j$ $|1\rangle_i|1\rangle_j \rightarrow -i|0\rangle_i|0\rangle_j + |1\rangle_i|1\rangle_j$ For example, when the two qubits (i-th and j-th qubits) are both initially in the hyperfine ground state $|0\rangle$ (denoted as $|0\rangle_i|0\rangle_j$) and subsequently a $\pi/2$-pulse on the blue sideband is applied to the i-th qubit, the combined state of the i-th qubit and the motional mode $|0\rangle_i|n_{ph}\rangle_m$ is transformed into a superposition of $|0\rangle_i|n_{ph}\rangle_m$ and $|1\rangle_i|n_{ph}+1\rangle_m$, and thus the combined state of the two qubits and the motional mode is transformed into a superposition of $|0\rangle_i|0\rangle_j|n_{ph}\rangle_m$ and $|1\rangle_i|0\rangle_j|n_{ph}+1\rangle_m$. When a $\pi/2$-pulse on the red sideband is applied to the j-th qubit, the combined state of the j-th qubit and the motional mode $|0\rangle_j|n_{ph}\rangle_m$ is transformed to a superposition of $|0\rangle_j|n_{ph}\rangle_m$ and $|1\rangle_j|n_{ph}-1\rangle_m$ and the combined state $0\rangle_j|n_{ph}+1\rangle_m$ is transformed into a superposition of $|0\rangle_j|n_{ph}+1\rangle_m$ and $|1\rangle_j|n_{ph}\rangle_m$.

Thus, applications of a $\pi/2$-pulse on the blue sideband on the i-th qubit and a $\pi/2$-pulse on the red sideband on the j-th qubit may transform the combined state of the two qubits and the motional mode $|0\rangle_i|0\rangle_j|n_{ph}\rangle_m$ into a superposition of $|0\rangle_i|0\rangle_j|n_{ph}\rangle_m$ and $|1\rangle_i|1\rangle_j|n_{ph}\rangle_m$, the two qubits now being in an entangled state. For those of ordinary skill in the art, it should be clear that two-qubit states that are entangled with motional mode having a different number of phonon excitations from the initial number of phonon excitations $n_{ph}$ (i.e., $|1\rangle_i|0\rangle_j|n_{ph}+1\rangle_m$ and $|0\rangle_i|1\rangle_j|n_{ph}-1\rangle_m$) can be removed by a sufficiently complex pulse sequence, and thus the combined state of the two qubits and the motional mode after the XX-gate operation may be considered disentangled as the initial number of phonon excitations $n_{ph}$ in the m-th motional mode stays unchanged at the end of the XX-gate operation. Thus, qubit states before and after the XX-gate operation will be described below generally without including the motional modes.

More generally, the combined state of i-th and j-th qubits transformed by the application of pulses on the sidebands for duration $\tau$ (referred to as a "gate duration"), having amplitudes $\Omega^{(i)}$ and $\Omega^{(j)}$ and detuning frequency $\mu$, can be described in terms of an entangling interaction $\chi^{(i,j)}(\tau)$ as follows:

$|0\rangle_i|0\rangle_j \rightarrow \cos(2\chi^{(i,j)}(\tau))|0\rangle_i|0\rangle_j - i\sin(2\chi^{(i,j)}(\tau))|1\rangle_i|1\rangle_j$ $|0\rangle_i|1\rangle_j \rightarrow \cos(2\chi^{(i,j)}(\tau))|0\rangle_i|1\rangle_j - i\sin(2\chi^{(i,j)}(\tau))|1\rangle_i|0\rangle_j$ $|1\rangle_i|0\rangle_j \rightarrow -i\sin(2\chi^{(i,j)}(\tau))|0\rangle_i|1\rangle_{nj} + \cos(2\chi^{(i,j)}(\tau))|1\rangle_i|0\rangle_j$ $|1\rangle_i|1\rangle_j \rightarrow -i\sin(2\chi^{(i,j)}(\tau))|0\rangle_i|0\rangle_j + \cos(2\chi^{(i,j)}(\tau))|1\rangle_i|1\rangle_j$ where, $$\chi^{(i,j)}(\tau) = -4\sum_{m=1}^{M} \eta_m^{(i)} \eta_m^{(j)}$$

$$\int_0^\tau dt_2 \int_0^{t_2} dt_1 \Omega^{(i)}(t_2)\Omega^{(j)}(t_1) \cos(\mu t_2) \cos(\mu t_1) \sin[\omega_m(t_2-t_1)]$$

and $\eta_m^{(i)}$ is the Lamb-Dicke parameter that quantifies the coupling strength between the i-th ion and the m-th motional mode having the frequency $\omega_m$, and M is the number of the motional modes (equal to the number N of ions in the group 106).

The entanglement interaction between two qubits described above can be used to perform an XX-gate operation. The XX-gate operation (XX gate) along with single-qubit gate operations (R gates) forms a set of gates {R, XX} that can be used to build a quantum computer that is configured to perform desired computational processes. Among several known sets of logic gates by which any quantum algorithm can be decomposed, a set of logic gates, commonly denoted as {R, XX}, is native to a quantum computing system of trapped ions described herein. Here, the R gate corresponds to manipulation of individual qubit states of trapped ions, and the XX gate (also referred to as an "entangling gate") corresponds to manipulation of the entanglement of two trapped ions.

To perform an XX-gate operation between i-th and j-th qubits, pulses that satisfy the condition $\chi^{(i,j)}(\tau)=\theta^{(i,j)}$ ($0<\theta^{(i,j)}\leq \pi/8$) (i.e., the entangling interaction $\chi^{(i,j)}(\tau)$ has a desired value $\theta^{(i,j)}$, referred to as condition for a non-zero entanglement interaction) are constructed and applied to the i-th and the j-th qubits. The transformations of the combined state of the i-th and the j-th qubits described above corresponds to the XX-gate operation with maximal entanglement when $\theta^{(i,j)}=\pi/8$. Amplitudes $\Omega^{(i)}(\tau)$ and $\Omega^{(j)}(\tau)$ of the pulses to be applied to the i-th and the j-th qubits are control parameters that can be adjusted to ensure a non-zero tunable entanglement of the i-th and the j-th qubits to perform a desired XX gate operation on i-th and j-th qubits.

III. Calibration

Quantum computation can be performed in a quantum computing system, such as the ion trap quantum computing system 100, using a set of quantum gate operations including single-qubit gate operations (R gates) and two-qubit gate operations, such as XX-gate operations (XX gates). Although the methods for applying such basic building blocks of quantum computation have been established, there are control errors, which result from mis-calibration of control parameters in hardware in the quantum computing system. These control errors are mainly due to the lack of knowledge about how the ions, and thus qubits, in the quantum computing system will behave during the quantum gate operations. Thus, calibration, the task of learning the control parameters in the quantum computing system and adjusting the control parameters to correct the control errors, is needed to provide scalable and reliable quantum computation results.

The calibration process typically requires repeated measurements of qubits to collect statistics over a sizable parameter space of the control parameters of the quantum computing system. Thus, the calibration process can be an expensive and time-consuming task. If, for example, all gate operations are calibrated, a sequence of calibration steps or processes increases quadratically as the number of qubits in the quantum computing system, and consequently the quality of calibration process may degrade. Therefore, a sequence of calibration steps or processes needs to be optimized within an acceptable error in quantum computation.

In the embodiments described herein, methods for optimizing resource for calibrating quantum gate operations to execute a batch of quantum circuits (i.e., a series of quantum gate operations) on a quantum computing system. In a quantum computing system, such as the ion trap quantum computing system 100, single-qubit gate operations (R gates) can be performed with high accurary with minimal calibration effort, thus only two-qubit gate operations, such as XX-gate operations (XX gates) are calibrated with significant effort.

III. A. Calibration Resource Specification

A quantum processor, such as the group 106 of trapped ions in the ion trap quantum computing system 100, is specified by a fully-connected system graph $G_s=(V_s, E_s, \in)$, in which vertices $i \in V_s$ represent physical qubits i (i.e., trapped ions) of the quantum processor. Each edge $(i,j) \in E_s$ that connects two vertices $i,j \in V_s$ for physical qubits i and j represents a two-qubit gate between the physical qubits i and j. Each edge $(i,j) \in E_s$ has an associated infidelity $\epsilon(i,j)$ for the two-qubit gate between the physical qubits i and j. The associated infidelity $\epsilon(i,j)$ is symmetric with respect to interchaging the physical qubits i and j (i.e., $\epsilon(i,j)=\epsilon(j,i)$).

Calibration of two-qubit gates in the ion trap quantum computing system 100 includes selecting a subset S of all edges $(i,j) \in E_s$ and tuning control parameters, associated with hardware in the ion trap quantum computing system 100, to calibrate the edges (i,j) in the subset S. In general, an associated infidelity $\epsilon(i,j)$ of an edge (i,j) inside the subset S that has been calibrated is lower than the associated infidelity $\epsilon(i,j)$ of an edge (i,j) outside the subset S that has not been calibrated. Calibration runs on the subset S (thus also referred to as a "calibration set"), and thus calibration is optimized if the subset S has the smallest size within an acceptable error.

Quantum computation in the ion trap quantum computing system 100 is performed by executaion of a batch $\mathcal{C}$ of quantum circuits c. A quantum circuit $c \in \mathcal{C}$ is specified by a circuit graph $G_c=(V_c, E_c, w)$, in which vertices $k \in V_c$ represent logical qubits k. Each edge $e=(k,l) \in E_c$ that connects two vertices $k,l \in V_c$ for logical qubits k and l represents a two-qubit gate between the two logical qubits k and l. It is assumed that the number of logical qubits $|V_c|$ is less than or equal to the number of physical qubits $|V_s|$ in the quantum processor 106. Each edge $e=(k,l) \in E_c$ for logical qubits k and l has an associated weight w(k,l) denoting the number of occurances of the two-qubit gate between the logical qubits k and l in the quantum circuit c∈$\mathcal{C}$. Each logical qubit k is mapped to a physical qubit i and the mapping between the logical qubits and the physical qubits is described below. Each quantum circuit c∈$\mathcal{C}$ is mapped to a set of single-qubit gates and two-qubit gates on the physical qubits i, which can be performed on a quantum processor, such as the group of trapped ions in the ion trap quantum computing system 100, by applying appropriate laser pulses to the physical qubits i by a system controller, such as the system controller 104.

Given a quantum circuit c∈$\mathcal{C}$ specified by a circuit graph $G_c=(V_c,E_c,w)$ and a quantum processor specified by a system graph $G_s=(V_s, E_s, \epsilon)$, the logical qubits k are mapped to physical qubits i such that infidelity $\epsilon(G_c, G_s)$ of the quantum circuit c∈$\mathcal{C}$ is mimimized. In some embodiments, this mapping relationship between the physical qubits i and logical qubits k is by a bijective map $\pi: V_c \to V_s$ (i.e., $\pi(G_c)=G_s$). By this map $\pi$, an edge $e=(k, l)\in E_c$ in the circuit graph $G_c$ is mapped to an edge $\pi(e)=(\pi(k),\pi(l))\in E_s$ in the system graph $G_s$ (i.e., $\pi(E_c)=E_s$). The mapping $\pi$ is computed such that the infidelity $\epsilon(G_c, G_s)$ of the quantum circuit c∈$\mathcal{C}$ excecuted on the system graph $G_s$ is mimimized:

$$\epsilon(G_c, G_s) = \min_{\pi} \Sigma_{e \in E_c} \epsilon(\pi(e)) \cdot w(e). \quad (1)$$

The average infidelity $\bar{\epsilon}(G_s)$ (i.e., the minimized infidelity $\epsilon(G_c, G_s)$ averaged over the quantum circuits c∈$\mathcal{C}$) is given by $$\bar{\epsilon}(G_s) = \frac{1}{|\mathcal{C}|}\Sigma_{c \in \mathcal{C}} \epsilon(G_c, G_s), \quad (2)$$

where $|\mathcal{C}|$ is the number of the quantum circuits c in the batch $\mathcal{C}$. In the embodiments described herein, a certain number Γ (referred to as a calibration budget) of two-qubit gates between physical qubits i and j is selected to be calibrated, where $|S| \leq \Gamma$. That is, a subset S, including $|S|$ two-qubit gates is selected to be calibrated. The subset S is selected such that the average infidelity $\bar{\epsilon}(G_s)$ shown in Equation (2) is minimized to $$\bar{\epsilon}^* = \min_{\substack{S \subseteq E_S \\ |S| \leq \Gamma}} \frac{1}{|\mathcal{C}|}[\Sigma_{c \in \mathcal{C}} \epsilon(G_c, G_s = (V_s, E_s, \epsilon_S))], \quad (3)$$

where $\epsilon_S$ is an associated infidelity with the two-qubit gates in the subset S that are calibrated.

Computing exactly the subset S that provides the minimized average infidelity $\bar{\epsilon}^*$ shown in Equation (3) is computationally hard, at least NP hard, and thus the embodiments described herein provide two heuristic methods to approximaly compute the subset S. Various notations and definitions used to describe the methods are summarized below.

First, it is assumed, for simplicity, all two-qubit gates for edge $e \in E_S$ have an equal associated infidelity $\epsilon_-$ before calibration and a reduced associated infidelity $\epsilon_+$ after calibration, where $\epsilon_+ < \epsilon_-$). This assumption is referred to as a binary gate fidelity model hereinafter. Then Equation (1) can be simplified as $$\epsilon(G_c, G_s) = \min_{\pi}\left[\epsilon_+ \sum_{\substack{e \in E_c \\ \pi(e) \in S}} w(e) + \epsilon_- \sum_{\substack{e \in E_c \\ \pi(e) \notin S}} w(e)\right]. \quad (4)$$

Thus, computing the mapping $\pi$ reduces to maximizing the first sum in Equation (4). For a predetermined calibration budget Γ, the first sum in Equation (4) can be maximazied to $$W_\Gamma = \max_{\substack{S \subseteq E_S \\ |S| \leq \Gamma}} \frac{1}{|\mathcal{C}|}\Sigma_{c \in \mathcal{C}}\left[\max_{\pi_c} \sum_{\substack{e \in E_c \\ \pi_c(e) \in S}} w(e)\right]. \quad (5)$$

Next, maximum common edge subgraph (MCEs) is introduced, since the calibration set S to be computed is to have a maximal overlap with a batch $\mathcal{C}$ of quantum circuits c in a typical scenario where the circuit graphs G, presumably have more edges e than the calibration budget Γ. The MCEs between two non-weighted graphs (i.e., weight w of edges e is either 0 or 1) consists of a maximum set of common edges as defined below.

Definition A.1 (Maximum Common Edge Subgraph) Maximum common edge subgraph identifies the isomorphic subgraph with the largest number of edges of a set of graphs ∩($G_1, G_2, \ldots, G_n$).

Figure 7:
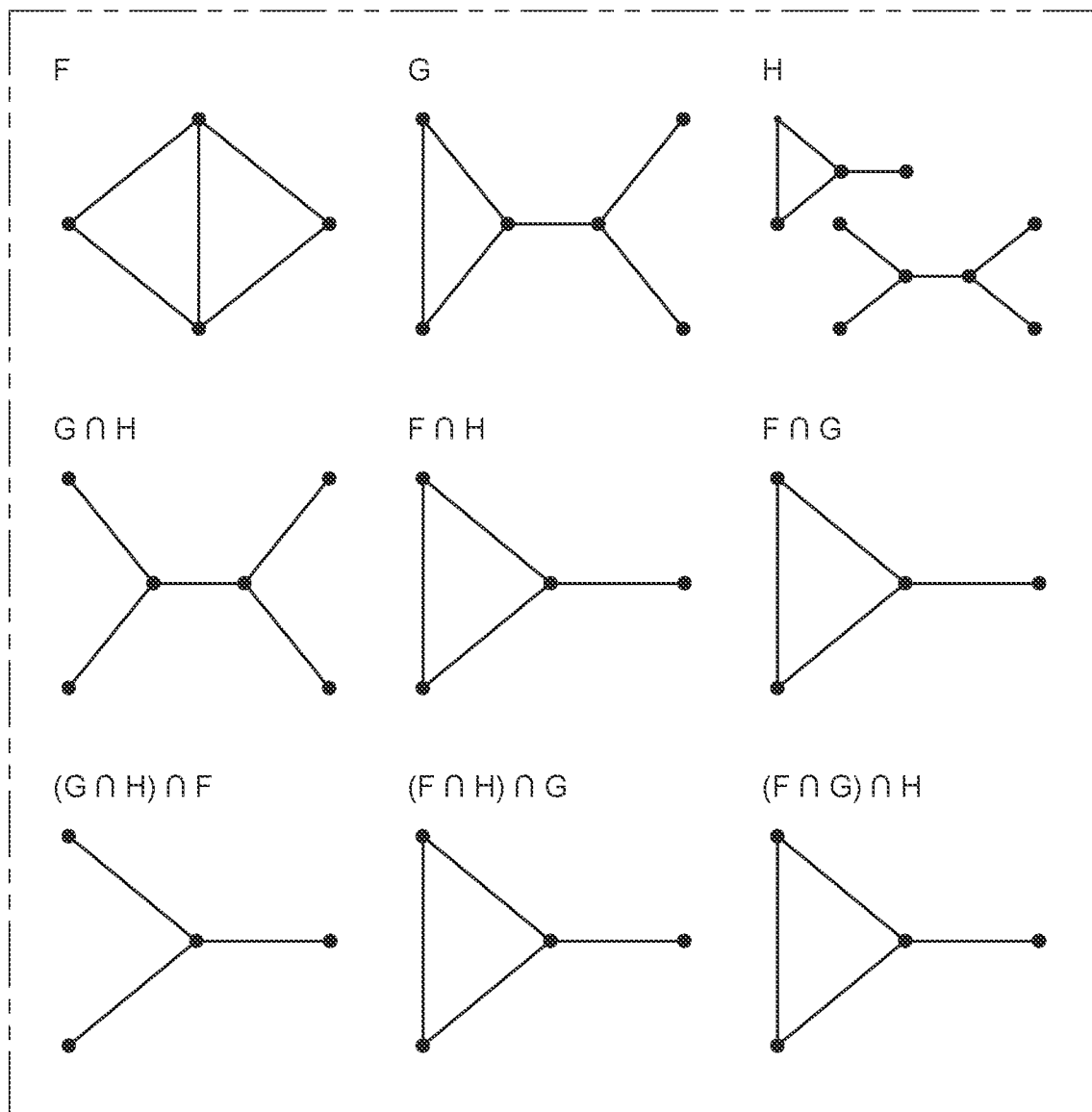
FIG. 7 depicts examples of pairwise maximum common edge subgraph (MCEs) according to one embodiment.

For a sequence of graphs $\{G_1, G_2, \ldots G_N\}$, the maximum common edge subgraph (MCEs) determined by sequentially calculating the pairwise MCEs, i.e., ((($G_1 \cap G_2$) ∩ $G_3$) ... ∩$G_N$), is not the same as the MCEs of the graph sequence as defined in Definition A.1. The brute force method of finding MCEs of n graphs requires maximizing over permutations of vertex-mapping for all graphs. This scales exponentially in the number of graphs n. Therefore, in the embodiments described herein, a MCEs of n graphs is computed by composing pairwise MCEs operations, reducing the complexity to be linear in the number of graphs n instead. Note, however, that the process of pairwise MCEs determination is not associative as shown in FIG. 7. In the example shown in FIG. 7, pairwise determination of MCEs for three graphs F, G, and H provides different final results depending on the order of composition of pairwise MCEs. Since considering all N! orderings, where N is the total number of graphs of which the MCEs is computed, is prohibitively expensive, the methods described herein provide heuristics to determine appropriate sequential orderings of pairwise MCEs.

For weighted graphs, in which edges each have a different weight, such as the circuit graph $G_c=(V_c,E_c, w)$, in which edge $e \in E_c$ has an associated weight w(e), heaviest cumulative subgraph (HCs) is considered to accomodate weight of the edges. Heaviest cumulative subgraph (HCs) is defined as below.

Definition A.2 (Heaviest Cumulative Subgraph) Heaviest cumulative subgraph is a common subgraph of multiple graphs, $\wedge(G_1, G_2, \ldots, G_n)$, with a maximum total weight of edges found as:

$$W_\wedge(G_1, G_2, \ldots, G_n) = \max_{\pi_1,\pi_2,\ldots\pi_n} \sum_{\substack{e \in \pi_1(G_1) \\ \cap \pi_2(G_2) \\ \vdots \\ \cap \pi_n(G_n)}} [w_{G_1}(\tilde{e}_1) + w_{G_2}(\tilde{e}_2) + \cdots + w_{G_n}(\tilde{e}_n)] \quad (6)$$

where $\tilde{e}_i = \pi_i^{-1}(e)$.

The definition of heaviest cumulative subgraph (HCs) is closely related to the calibration set S. For example, between two graphs G, a complete graph with two vertices, and H, a complete graph with three vertices and edges each having a different weight, the optimal calibration set S for the calibration budget $\Gamma=1$ is the HCs between graphs G and H. That is, the mapping of G to H is determined such that the cumulative edge weights is maximized.

In a non-trivial example, however, the definition of heaviest cumulative subgraph (HCs) is insufficient to compute the heaviest cumulative subgraph. Thus, Most Compact Cumulative Supergraph (MCCS) is considered here. To minimize the average infidelity $\bar{\epsilon}(G_s)$ shown in Equation (2), the optimal mapping $\pi$ can be computed such that the supergraph of the mapped circuit graphs $G_c$ maximizes the sum of weights of the heaviest $\Gamma$ edges. By construction, this supergraph will contain a subgraph with $\Gamma$ edges that admits a large overlap with all the mapped circuit graphs $G_c$. Most Compact Cumulative Supergraph (MCCS) is defined as below. In the binary gate fidelity model in which all two-qubit gates for edge $e \in E_S$ have an equal associated infidelity $\epsilon_-$ before calibration and a reduced associated infidelity $\epsilon_+$ after calibration, the MCCS of the circuit graphs $G_c$ is known to be the solution for Equation (5) for a given calibration budget $\Gamma$.

Definition A.3 (Most Compact Cumulative Supergraph) Most compact cumulative supergraph with respect to calibration budget $\Gamma$ is the supergraph of a set of graphs, $\vee_\Gamma (G_1, G_2, \ldots, G_n)$, with the largest sum of weights on $\Gamma$ edges. It can be found by maximizing the total weight of $\Gamma$ heaviest edges as $$W_\Gamma(G_1, G_2, \ldots, G_n) = \max_{\pi_1,\pi_2,\ldots\pi_n} \sum_{\substack{e \in \pi_1(G_n) \\ \cap \pi_2(G_2) \\ \vdots \\ \cap \pi_n(G_n)}}^{\Gamma} {}'[w_{G_1}(\tilde{e}_1) + w_{G_2}(\tilde{e}_2) + \cdots + w_{G_n}(\tilde{e}_n)], \quad (7)$$

where the primed sum is for the first $\Gamma$ largest elements.

In some embodiments, circuit graphs $G_c = (V_c, E_c, w)$ have less number of edges $e \in E_c$ than the calibration budget $\Gamma$. In this case, the supergraph having the smallest size that include all circuit graphs $G_c$ can be considered. The supergraph has the number of edges smaller or equal to the calibration budget $\Gamma$, all edges in the supergraph can be calibrated without considering the edge weights. This supergraph is referred to as minimum common edge supergraph (mCES) and defined as below.

Definition A.4 (Minimum Common Edge Supergraph) Minimum common supergraph identifies the smallest graph that contains all graphs from a set, $\cup(G_1, G_2, \ldots, G_n)$.

III. B. Calibration Resource Minimization

As described above, calibration resource can be minimized by finding most compact cumulative supergraph (MCCS) of a set of circuit graphs $G_c$ for a given calibration budget $\Gamma$. In the embodiments described herein, two heuristic methods for finding MCCS, a method 800 for computing MCCS by the approximate MCCS algorithm, and a method 900 for computing MCCS by the genetic algorithm known in the art.

B.1 Approximate MCCS Algorithm
B.1.1 General Outline of the Algorithm

Figure 8:
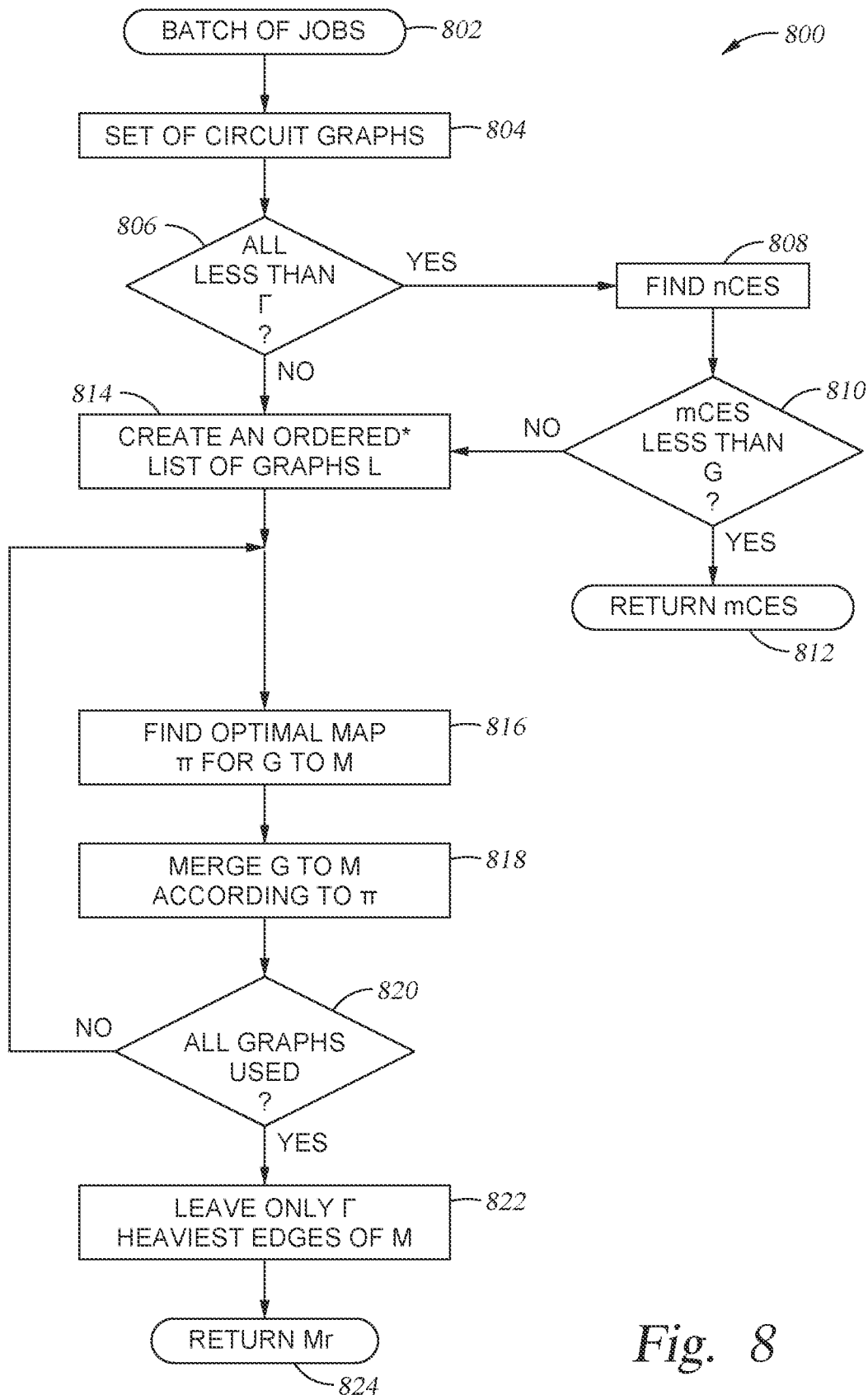
FIG. 8 depicts a flow chart illustrating a method of computing most compact cumulative supergraph (MCCS), by the approximate MCCS algorithm, according to one embodiment.

FIG. 8 depicts a flow chart illustrating the method 800 of computing most compact cumulative supergraph (MCCS, referred to simply as M hereinafter), by the approximate MCCS algorithm, for a set of circuit graphs $G_c = (V_c, E_c, w)$ that specify a batch $\mathcal{C}$ of quantum circuits $c \in \mathcal{C}$. This supergraph is used to compute the mappings $\pi$ between the set of circuit graphs $G_c = (V_c, E_c, w)$ and a system graph $G_s$ such that the infidelity $\epsilon(G_c, G_s)$ shown in Equation (2) is minimized.

In block 802, by the classical computer 102, a batch C of quantum circuits $c \in \mathcal{C}$ to be calibrated is received.

In block 804, by the classical computer 102, a set of circuit graphs $G_c = (V_c, E_c, w)$ is computed based on the received batch $\mathcal{C}$ of quantum circuits $c \in \mathcal{C}$. In forming the set of circuit graphs $G_c$, graph isomorphism is taken into account. That is, the set contains circuit graphs $G_c$ that are not isomorphic to one another. In the case of weighted graphs, a modified definition of graph isomorphism is used, where two weighted graphs $G=(V_1, E_1, w_1)$ and $H=(V_2, E_2, w_2)$ are isomorphic if there is a bijective mapping $\pi$ between the sets of vertices of the two graphs, $\pi: V_1 \to V_2$, such that the mapping preserves weighted adjacency, i.e., $w_1(e)=w_2(\pi(e))$ $\forall e \in E_1$. Edges $e \in E_c$ and associated weights $w(e)$ are saved separately in a dictionary in a non-volatile memory of the classical computer 102.

In block 806, by the classical computer 102, the number of edges $e \in E_c$ is computed. If every number of edges $e \in E_c$ for all quantum circuits $c \in \mathcal{C}$ is equal to or less than a pre-determined calibration budget $\Gamma$, the method 800 proceeds to block 808. If at least one of the number of edges $e \in E_c$ is more than the pre-determined calibration budget $\Gamma$, the method 800 proceeds to block 814.

In block 808, by the classical computer 102, the minimum common edge supergraph (mCES) of the set of circuit graphs $G_c = (V_c, E_c, w)$ is computed.

In block 810, by the classical computer 102, the number of edges in the minimum common edge supergraph (mCES) of the circuit graphs $G_c = (V_c, E_c, w)$ is computed. If the number of edges in the mCES is equal to or less than the pre-determined calibration budget $\Gamma$, all edges in the mCES can be calibrated regardless of the associated weights of the edges. Then, the method 800 proceeds to block 812. If the number of edges in the mCES is more than the pre-determined calibration budget $\Gamma$, the method 800 proceeds to iterations to compute MCCS M starting in block 814.

In block 812, by the classical computer 102, the computed minimum common edge supergraph (mCES) is output as a computation result.

In block 814, by the classical computer 102, an intial iteration of the approximate and iterative computation of MCCS, M is performed. In block 814, a graph M is initialized to a null graph (i.e., including no circuit graphs $G_c$), and an ordered list L of the circuit graphs $G_c$ is created.

The ordered list L is created by ordering the circuit graphs in the order of the number of their edges, from largest to smallest.

In block 816, by the classical computer 102, mapping $\pi$ that maps the set of circuit graphs $G_c$ to the system graph $G_s$ is computed. First, the mapping $\pi$ for the first circuit graph $G_c$ (referred to simply as G) in the ordered list L is computed. The mapping $\pi$ is computed such that an overlap between the circuit graph G and graph M. The computing of the mapping $\pi$ is described below in more details.

In block 818, by the classical computer 102, the graph G is mapped by the mapping $\pi$, and the mapped graph $\pi(G)$ is merged with the graph M, as described by $M=(V_M, E_M, w_M) \mapsto M=(V_M \cup V_{\pi(G)}, E_M \cup E_{\pi(G)}, w_M + w_{\pi(G)})$.

In block 820, the method 800 returns to block 816 for a subsequent circuit graph $G_c$ in the ordered list L. If all circuit graphs $G_c$ in the ordered list L have been considered, the method 800 proceeds to block 822. The resulting graph M is a cumulative supergraph of all circuit graphs $G_c$ in the ordered list L. Graph M is an approximate MCCS of all circuit graphs $G_c$.

In block 822, among edges in the cumulative supergraph M, $\Gamma$ heaviest edges are selected and the remaining edges are removed. This final graph, denoted as $M_\Gamma$, is an approximate solution that contains the calibration set S as its edges. Once the solution $M_\Gamma$ is identified, a round of optimal mapping for each input circuit to $M_\Gamma$ is made to maximize the overlap between $M_r$ and each input circuit. This step is performed since the mappings used previously in constructing graph M is suboptimal for the maximal overlap problem with $M_\Gamma$. The method described herein uses the mappings identified at this step as the final mappings for each of the circuig graphs $G_c$.

In block 824, by the classical computer 102, the computed graph $M_\Gamma$ is output as a computational result.

It should be noted that arranging the circuit graphs $G_c$ as described above may likely lead to an exact solution for the MCCS solution when using the sequential merging approach laid out above.

B.1.2 Algorithms For The Optimal Mapping

In block 806, the mapping $\pi$ is computed such that an overlap between the circuit graph G and a graph M. This may be considered as an extension of the maximum common edge subgraph (MCEs) problem to weighted graphs. The algorithm of finding the most optimal mapping is referred to as a backtracking algorithm, which is similar to the depth-first search (DFS) algorithm known in the art, except the bactracking algorithm does not involve all the possible branches but backtracks earlier based on a predictor function that checks whether the started mapping is worth completing based on the optimization goals. As a basis for the backtracking algorithm, the SplitP algorithm known in the art is used with a modified predictor function. Instead of maximizing the number of common edges of graphs, the cumulative weight on the common subgraph is maximized to achieve a heaviest cumulative subgraph (HCs). An additional criterion is used when there are multiple potential maps. In this scenario, the map is chosen such that incurs the least subgraph transformation cost between $\pi(G)$ and M incurred. This criterion is helpful to minimize the number of heaviest edges in the final cumulative supergraph M.

Definition B.1 (Subgraph Transformation Cost) Subgraph transformation cost $S(G, H)$ between two weighted graphs G and H is the transformation cost (see below) on the graph formed by the set of their common edges $$S(G, H) = \Sigma_{\substack{e \in G \\ e \in H}} |w_G(e) - w_H(e)|. \quad (9)$$

Definition B.2 (Transformation Cost) Transformation cost $T(G, H)$ between two weighted graphs G and H includes the sum of weights for added/removed edges and change in weight for the common edges.

$$T(G, H) = \Sigma_{\substack{e \in G \\ e \notin H}} w_G(e) + \Sigma_{\substack{e \notin G \\ e \in H}} w_H(e) + \Sigma_{\substack{e \in G \\ e \in H}} |w_G(e) - w_H(e)| = \quad (10)$$

$$\Sigma_{e \in G \cup H} f_C(w_G(e), w_H(e)),$$

where $w_G(e)=0$ if $e \notin G$. In general the cost function $f_c(w_G(e), w_H(e))$ can be an arbitrary distance function on $w_G(e)$ and $w_H(e)$. In some embodiments, the minimum transformation cost is used since, when applied to a non-weighted case, it reduces the mapping problem to the maximum common edge subgraph (MCEs) problem ($\min_\pi T(\pi(G), H) = |G| + |H| - 2|G \cap H|$), where $|G|$ denotes the number of edges of G.

Specifically, the mapping algorithm that identifies an optimal mapping of vertices of G to M repeatedly calls a search function. The search function looks for a heaviest cumulative subgraph (HCs) between the G and M with a pre-specified number of edges. If found, the function also returns the vertex maps from G to M, used to induce the HCs. By iteratively reducing the aforementioned pre-specified number of edges, starting from the number of edges of the smaller of the two input graphs G and M, the largest possible HCs between G and M can be detemined.

The implementation of the search function is technically involved. Briefly, given the two input graphs G and M and the pre-specified number of edges, the function builds up a mapping using a depth-first search, starting with the empty mapping, and pairing an edge heuristically chosen from G with an appropriate edge from M at each level of the search tree. The function backtracks if a search in one branch has a little chance to beat the best results found so far. The function also backtracks if the calculated bound is less than the pre-specified number of edges. The bound here is calculated as the number of edges that were mapped already plus the maximal number of edges that could be mapped based on their adjacency with respect to the mapped ones.

B.1.3 Beam Search

While the backtrack algorithm used herein can be considered to be a more advanced version of the depth-first search (DFS) algorithm, it still scales poorly with the size of the graphs. To make the approach more scalable, a threshold can set on the predicted improvement while exploring a branch, when compared to the best found so far. Especially, the stronger condition requires the projected cumulative weight of the potential subgraph to exceed the best found, plus the added threshold. Otherwise the potential map is dismissed from further consideration. Multiple branches can be furether explored, while capping the number of potential maps or walkers on the search tree to n, i.e., keeping only n most promising ones.

For a large number of qubits, circuit graphs in the batch may have small heaviest cumulative subgraph (HCs), which would lead to a quick explosion in the size of the merged graph M. This results in a rapid increase in the computational resource required for the optimal mapping search described in the previous section. Thus, the size of M may be limited by keeping the number of edges of M to be below $k\Gamma$. This can be achieved by choosing to keep $k\Gamma$ heaviest edges, while discarding the rest of the edges, should a determined M at any stage has more than $k\Gamma$ edges, where $k>1$.

B.2 Genetic Algorithm

Figure 9:
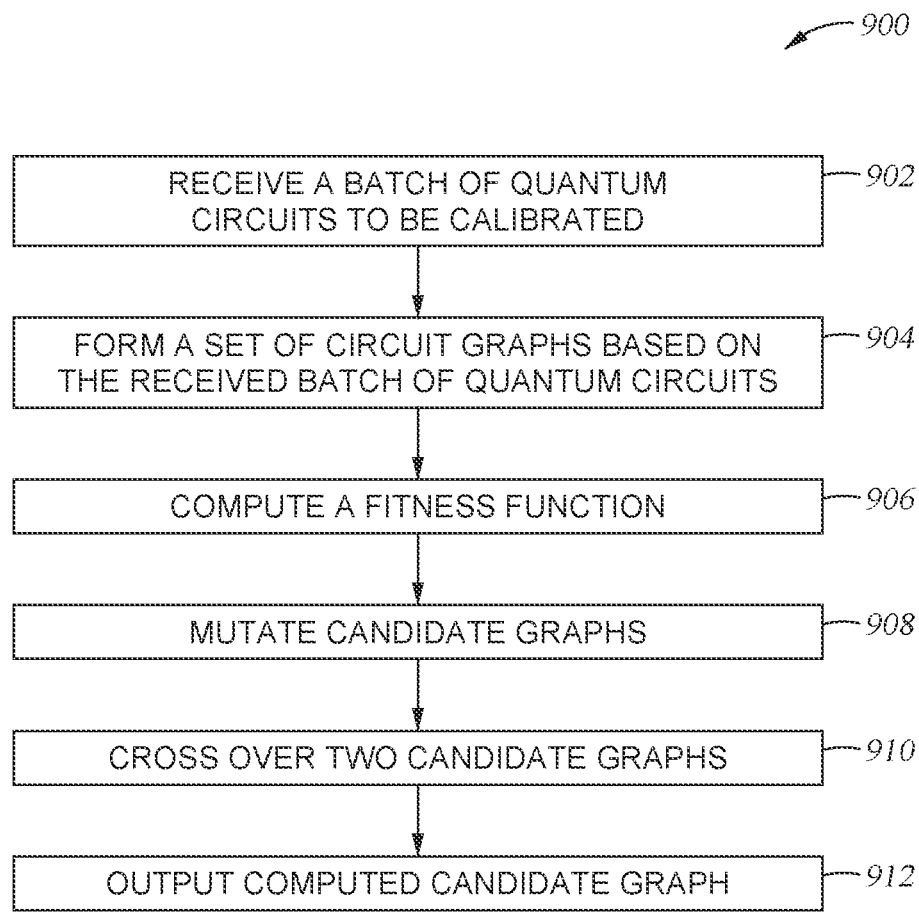
FIG. 9 depicts a flow chart illustrating a method 900 of computing most compact cumulative supergraph (MCCS), by the genetic algorithm, according to one embodiment.

FIG. 9 depicts a flow chart illustrating the method 900 of computing most compact cumulative supergraph (MCCS), by the genetic algorithm. The genetic optimization algorithm has, in its memory, a population of subgraphs. In each generation, a fraction of that population is selected to move on to the next generation based on their fitness. In addition, mutated copies of fittest members of a population may be produced. In a mutation, a graph undergoes a random change in its structure. Some pairs of parents from the current population may be selected and used in a crossover function to produce children for next generation. These children are expected to combine and improve the good feature of the parents. A small fraction is selected to mutate in which the graph undergoes a random change in its structure. The population size from generation to generation is held to a constant number. After a certain number of generations, the best member of the surviving population is returned as the optimal solution.

In the method 900 for computing most compact cumulative supergraph (MCCS) that minimizes the infidelity $\varepsilon(G_c, G_s)$ shown in Equation (2), the negative of the infidelity $\varepsilon(G_c, G_s)$ shown in Equation (2) is consided as in the fitness function in the genetic algorithm. In some embodiments, to calculate this fitness of a candidate graph G for the a system graph $G_s$, the optimal vertex map for each circuit graph $G_c$ to the candidate graph G is found. It should be noted computing the fintess function is already a challenging task because it requires computation of an optimal mapping from a circuit graph to a system graph. To compute the mapping, backtrack heaviest cumulative subgraph (HCs) and maximum common edge subgraph (mCES) algorithms described above are used. Therefore, the performance of the genetic algorithm is closely tied to the performance of computation of the mapping.

In block 902, by the classical computer 102, a batch C of quantum circuits $c \in \mathcal{C}$ to be calibrated is received.

In block 904, by the classical computer 102, a set of circuit graphs $G_c=(V_c, E_c, w)$ is computed based on the received batch $\mathcal{C}$ of quantum circuits $c \in \mathcal{C}$.

In block 906, by the classical computer 102, a fitness function which is a negative of the infidelity $\varepsilon(G_c, G_s)$ shown in Equation (2) is computed.

In block 908, some of the candidate graphs G are mutated (i.e., some of the candidate graphs G are randomly replaced with some of the circuit graphs $G_c$ that are not in the candidate graphs G). Mutating a graph $G=(V, E)$, where the number of edges $e \in E$ is equal to the calibration budget $\Gamma$, with a mutation rate $p_m$ includes $p_m|E|$ new edges from all possible edges in candidate graphs G, and sampling randomly $(1-p_m)*|E|$ edges from edges $e \in E$ in the original graph G.

In block 910, pairs of two candidate graphs G are crossed over. Crossing over two graphs (i.e., parents) $G_1=(V, E_1)$, $G_2=(V, E_2)$, two more graphs $G_3=(V, E_3)$ and $G_4=(V, E_4)$ are generated where the edges $E_3$ and $E_4$ are produced by sampling from $E_1 \cup E_2$ with the constraint $|E_3|=|E_4|=\Gamma$. If the fitness function of the candidate graph G is less than a pre-determined threshold value, the method 900 returns to block 906. If the fitness function of the candidate graph G exceeds the pre-determined threshold value, the method 900 proceeds to block 912. In another embodiment, a pre-determined number $n_G$ of crossovers can be considered, returning to block 906 $n_G$ times, where the method 900 proceeds to block 912 after $n_G$ iterations.

In block 912, the computed best-fit candidate graph G that contains the calibration set S as its edges and output as a computation result.

III. C. Examples

In the following, example simulation results for optimized calibration of quantum gates for a given calibration budget F are shown. In the examples disclosed herein, quantum circuits are executed on a quantum processor 106 that includes eleven trapped ions in the ion trap quantum computing system 100. Quantum circuits are executed on 10 to 20 physical qubits.

To demonstrate the quality of methods described herein, example simulation results are compared against the following primitive calibration techniques. A first primitive mapping technique (referred to as a "random approach") is a completely unoptimized, trivial approach that is to calibrate F random gates, then execute the circuits without any mapping betweem logical qubits and physical qubits. A second primitive mapping technique (referred to as a "naive approach") is a slightly optimized, but still the naive approach that is to count the number of gates in each circuit and calibrate F most frequently used ones, without any mapping between logical qubits and physical qubits. As described above, in block 822 of the MCCS-based method 800, a round of (re)mapping is used from circuit graphs $G_c$ to the system graphs $G_s$. Use of this (re)mapping on top of the random or naive approaches are referred to as the respective, and asterisked methods. It should be noted that these asterisked methods rely on the maximum common edge subgraph (MCEs) or heaviest cumulative subgraph (HCs) mapping functions as described herein.

Figure 10A:
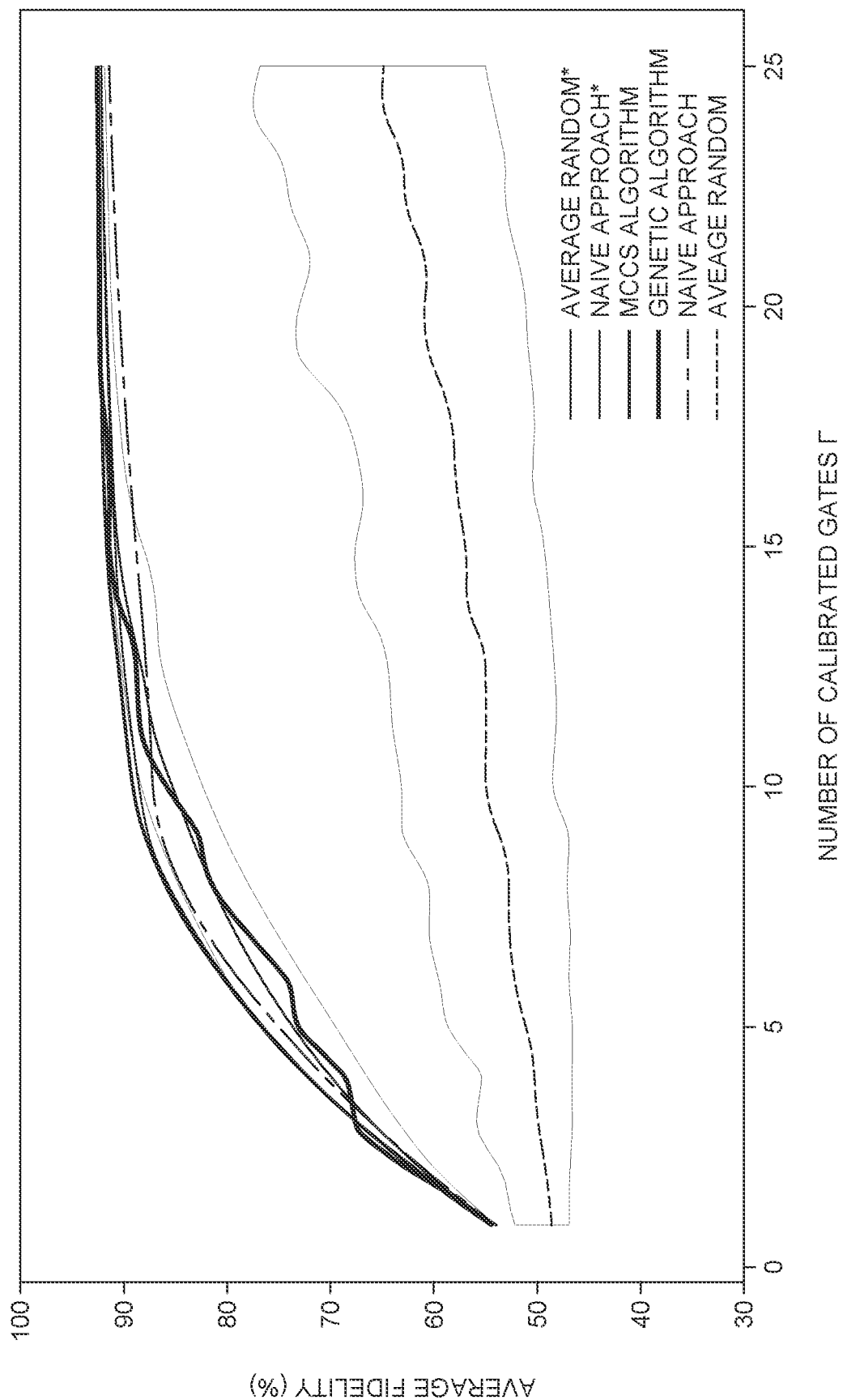
FIGS. 10A and 10B depict example simulation results of average fidelity of a input quantum circuit and reduction in requirement for a calibration budget according to one embodiment.
Figure 10B:
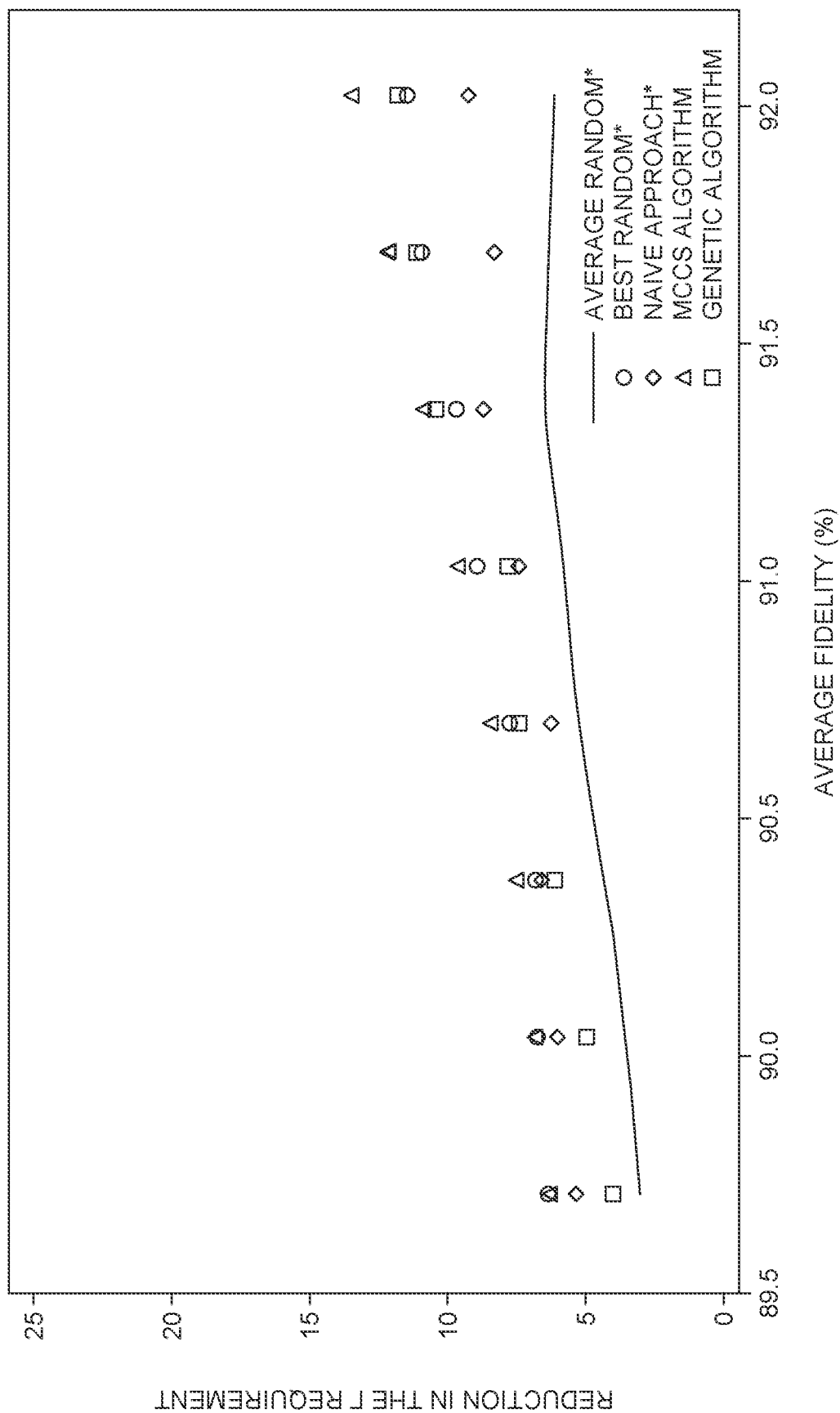

FIGS. 10A and 10B depict example simulation results of the average fidelity of the input quantum circuit c as a function of the caribration budget F, and reduction in the requirement for the calibration budget $\Gamma$ to achieve targeted average fidelities, respectively, for 30 most common non-weighted graphs. In the examples shown, the reduced associated infidelity $\epsilon_+$ after calibration is $\epsilon_+=1\%$ and the associated infidelity $\epsilon_-$ before calibration is $\epsilon_-=10\%$. In FIG. 10A, dashed lines show fidelities for naively and randomly generated system graphs. Blue area covers 90% confidence interval from best to worst random assignment. Solid lines show fidelities for average random and naive approaches with qubit mapping (* denotes the presence of this mapping), as well as the ones generated with most compact cumulative supergraph (MCCS) and the genetic algorithm. The average random approaches are averaged over 100 random instances. In FIG. 10B, the reduction in the F requirement is shown for the methods that leverage qubit mapping, with the baseline being the naive approach. The reduction values are calculated as a difference in F requirement expected from the average fidelity curve in FIG. 10A obtained by linearly interpolating the data points (not shown) in FIG. 10A.

Average fidelities for all methods (using the MCCS algorithm, the genetic algorithm, and the primitive techniques) are estimated assuming that $\Gamma$ calibrated gates have infidelity $\epsilon_+ =1\%$, while the rest has infidelities $\epsilon_- =10\%$.

Figure 11A:
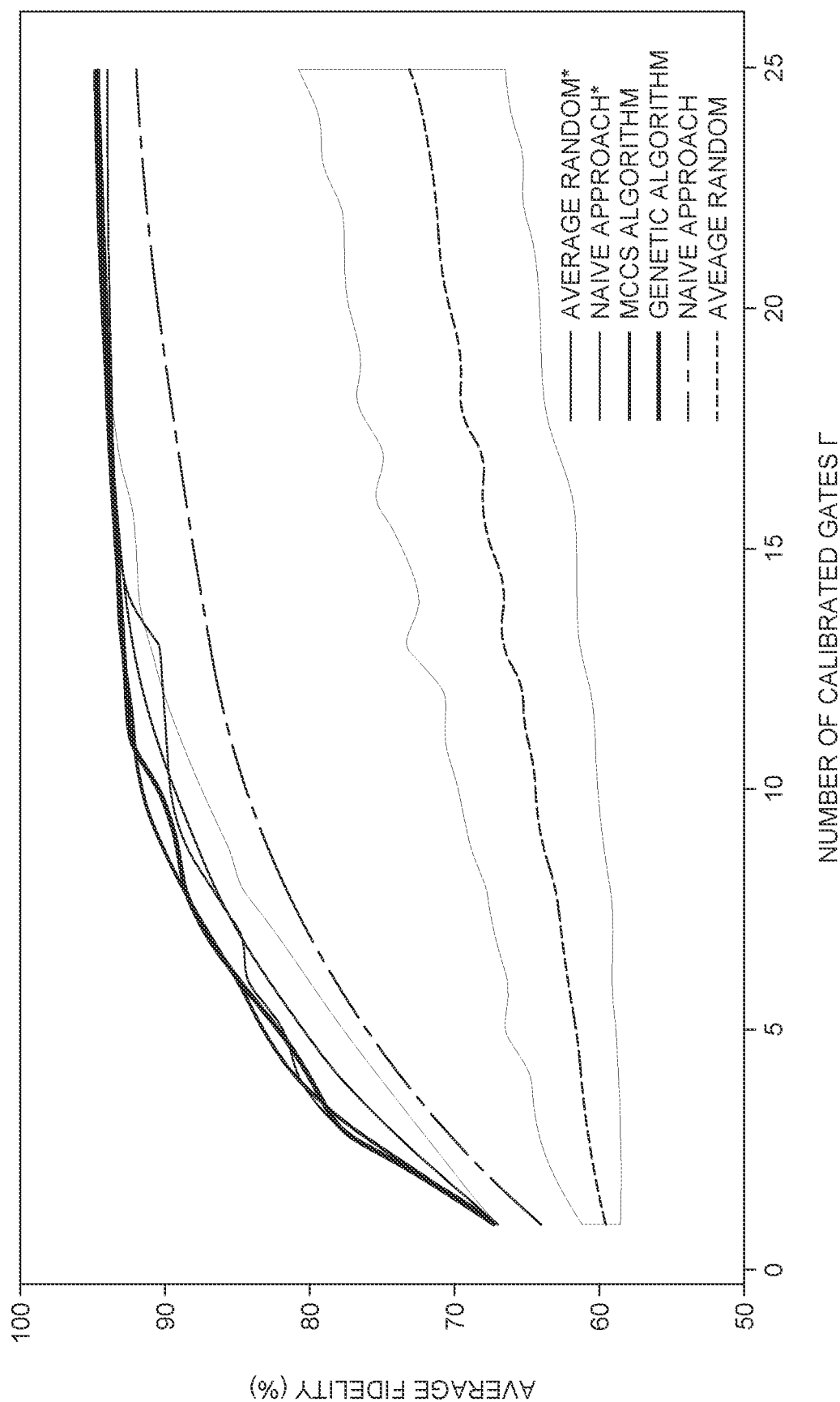
FIGS. 11A and 11B depict example simulation results of average fidelity of a input quantum circuit and reduction in requirement for a calibration budget according to one embodiment.
Figure 11B:
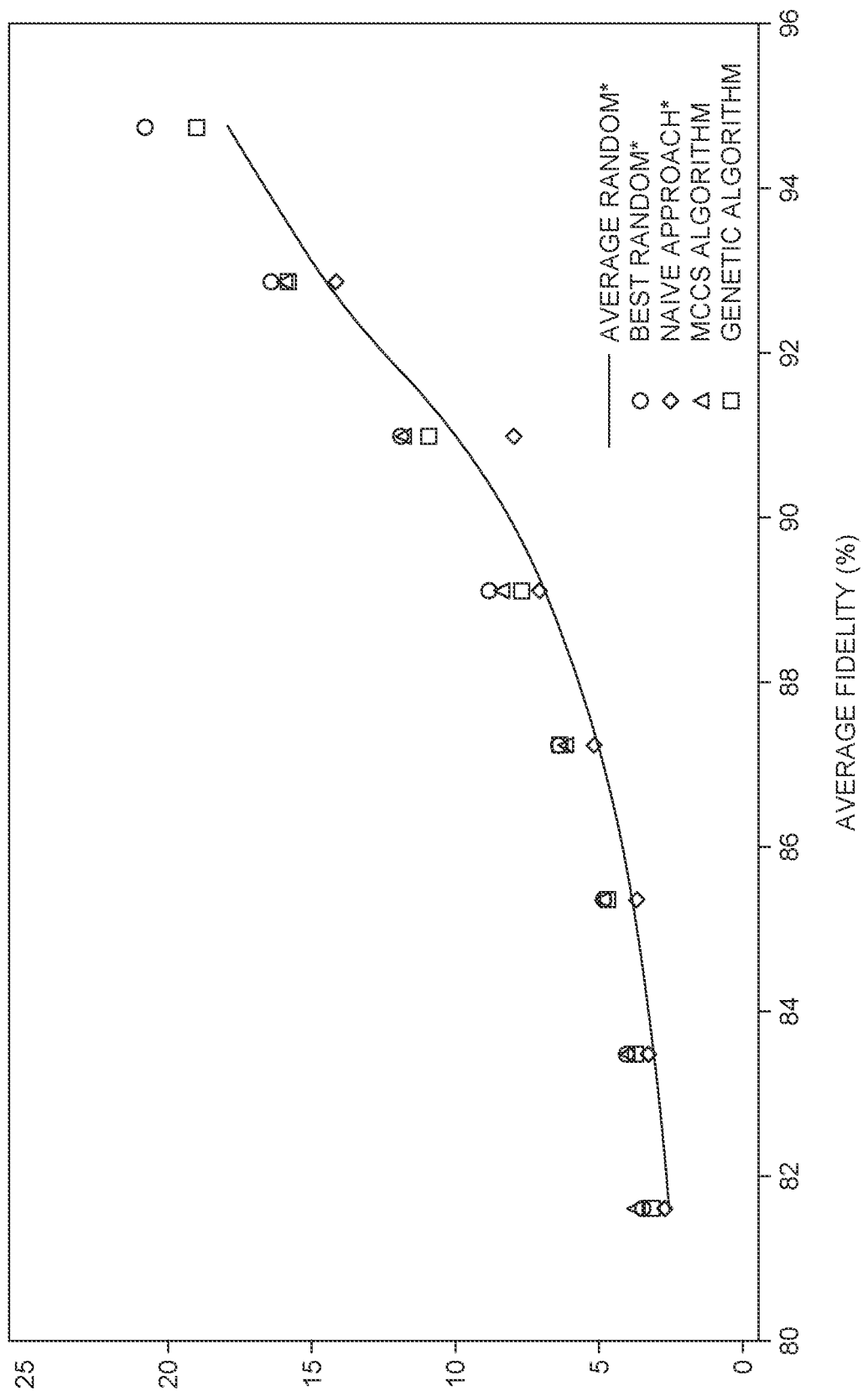

FIGS. 11A and 11B depict example simulation results of the average fidelity of the input quantum circuit c as a function of the calibration budget $\Gamma$, and reduction in the requirement for the calibration budeget $\Gamma$ to achieve targeted average fidelities, respectively, for 40 most common weighted graphs. In the examples shown, the reduced associated infidelity $\epsilon_+$ after calibration is $\epsilon_+ =1\%$ and the associated infidelity $\epsilon_-$ before calibration is $\epsilon_- =10\%$. In FIG. 11A, dashed lines show fidelities for naively and randomly generated system graphs without individual circuit remapping. Blue area covers 90% confidence interval from best to worst random assignment. Solid lines show fidelities for average random and naive approaches with qubit mapping (* denotes the presence of this mapping), as well as the ones generated with most compact cumulative supergraph (MCCS) and the genetic algorithm. The average random approaches are averaged over 100 random instances. In FIG. 11B, the reduction in $\Gamma$ requirement is shown for the methods that leverage qubit mapping, with the baseline being the naive approach. The reduction values are calculated as a difference in $\Gamma$ requirement expected from the average fidelity curve in FIG. 11A obtained by linearly interpolating the data points (not shown) in FIG. 11A.

Figure 12A:
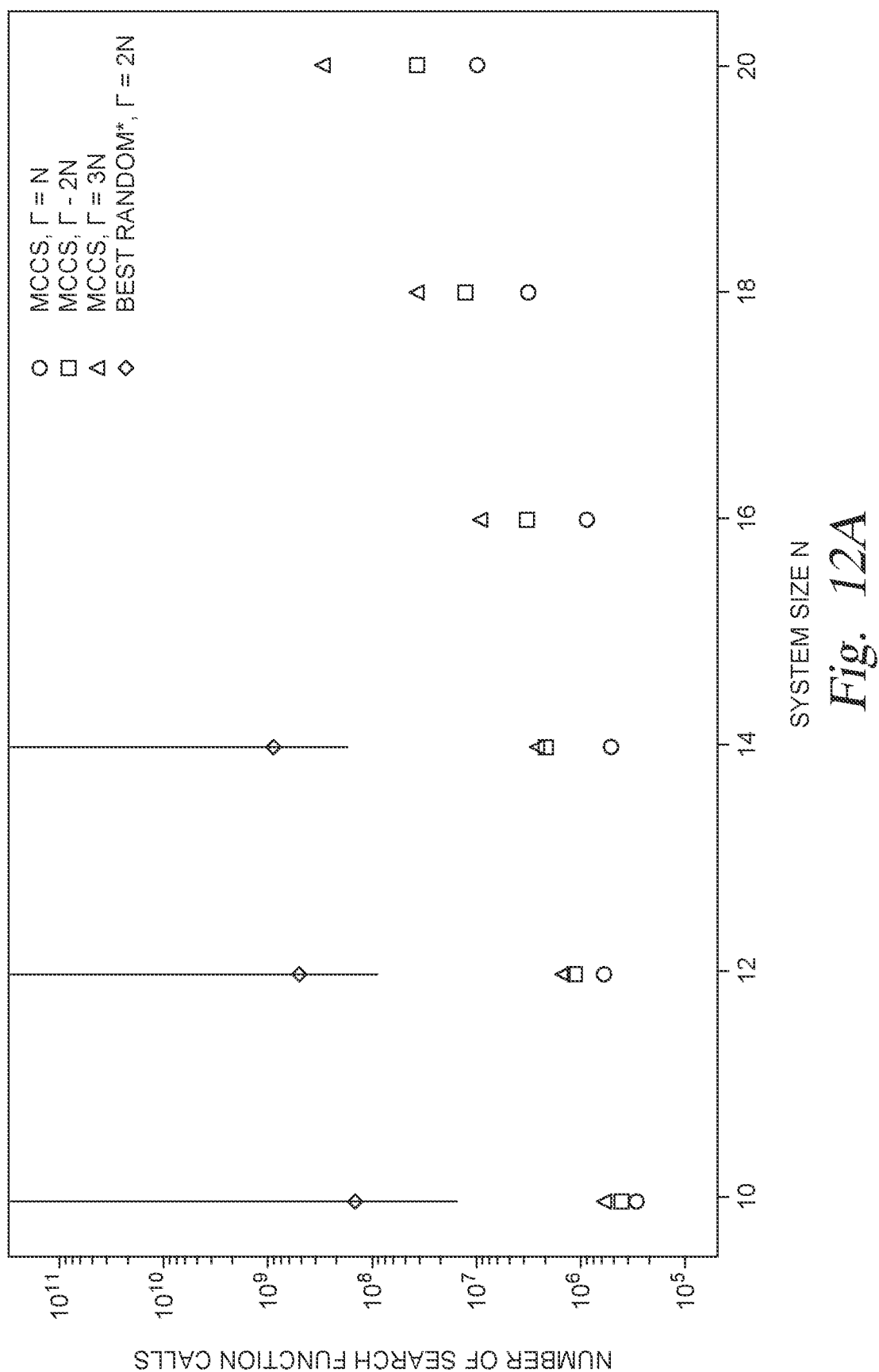
FIGS. 12A and 12B depict example simulation results of the number of calls to search function and reduction in requirement for a calibration budget according to one embodiment.
Figure 12B:
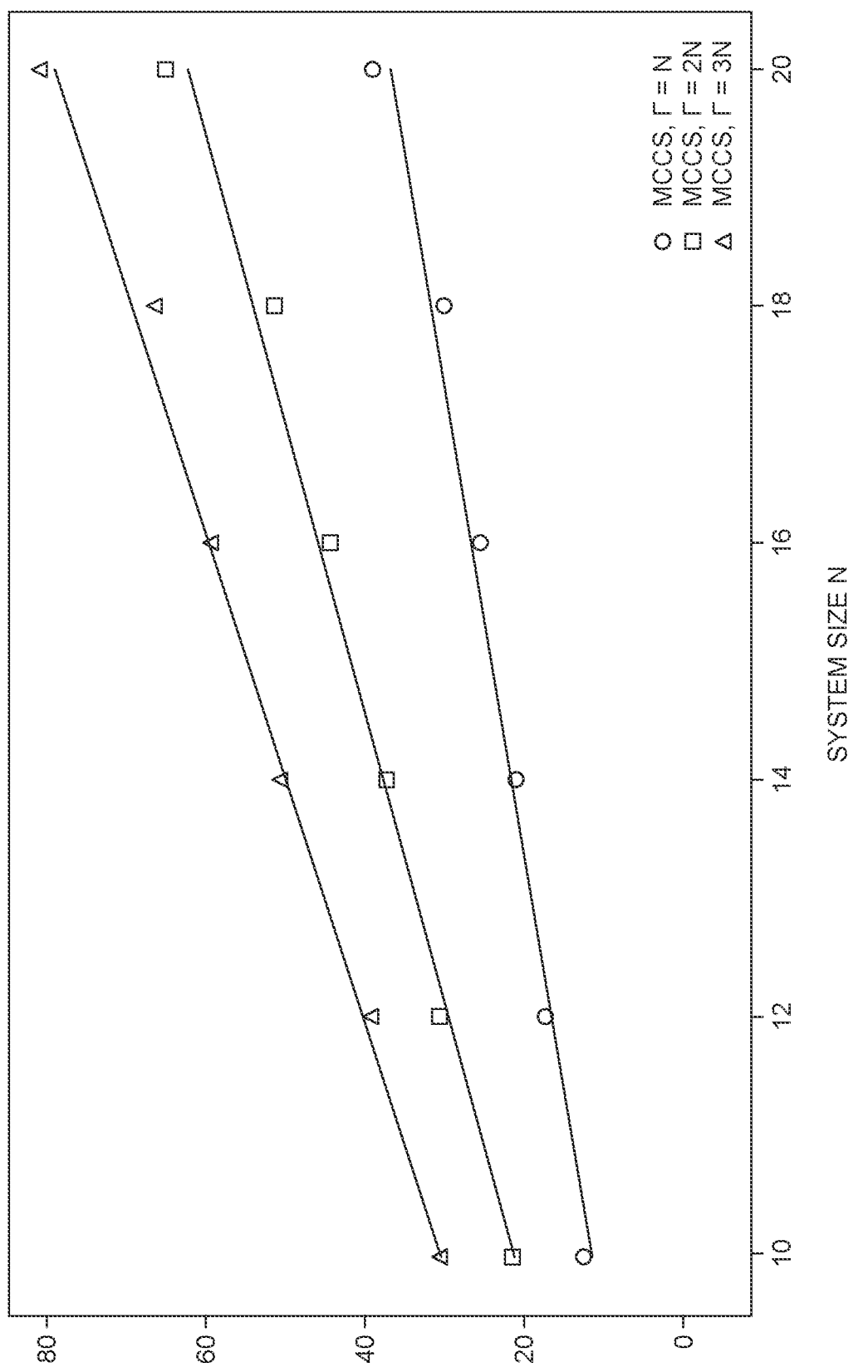

FIGS. 12A and 12B depict example simulation results of the number of calls to the search function within the beam-search versions of the MCCS algorithm, and reduction in the requirement for a calbration budget $\Gamma$ to achieve a targeted average fidelity, respectively, compared to the naive approach that grants the same fidelity for different system sizes N and $\Gamma$=N, 2N, 3N. Projected number of calls to the search function in FIG. 12A within the best random approach with mapping for N=10, 12, and 14 and $\Gamma$=2N is shown with error bars marking 90% confidence intervals of the random distribution. The reduction values in FIG. 12B for each N are calculated as the additional $\Gamma$ required to achieve the same fidelity as the MCCS method by the naive method. The average fidelity curves for the naive method is obtained by linearly interpolating the data points (not shown). The lines in FIG. 12B show the fit function of the reduction $\Gamma_{reduced}$ as a function of the system size N, which is the form $\Gamma_{reduced}=\Gamma(N)+C_x(N-10)$, where $C_x$ was estimated to be 1.5, 2.1 and 1.9 for the three cases respectively.

The scalability of the methods described herein has been shown in the examples using artificially generated batches of circuits for different system sizes, each batch consisting of five line-shaped graphs, five star-shaped graphs, five random trees and N randomly selected small-diameter regular graphs, where N is the number of qubits. This particular composition was motivated by the line, star and tree shapes appearing frequently in quantum programs run on a quantum computing system such as the ion trap quantum computing system 100. Small diameter, regular graphs of the form (k,d,n), where k is degree of the graph, d is the diameter of the graph, and n is the number of vertices, were selected as they are tailor made to leverage the all-to-all qubit connectivity available in a quantum computing system such as the ion trap quantum computing system 100. In the examples shown in, the MCCS solutions are computed for batches generated for six different system sizes, ranging from N=10 . . . 20 qubits, and the calibration budget $\Gamma$=N, 2N, 3N are considered. The number of calls to the search function, as a measure of the execution time, is shown in FIG. 12A. The number of calls expected for the best random approach are also computed, by first computing the best average fidelity obtained as a function of the number random trials for the benchmark circuits, then extrapolating this to match the average fidelity obtained by the MCCS method. This then is converted to the number of calls to the search function, which is of the form M/2× (the number search calls for a MCCS solution), as per the method described herein. For $\Gamma$=2N solutions, the expected numbers of trials are M≈700 for N=10, M≈800 for N=12, and M≈750 for N=14 (FIG. 12A), which is more than 2.5 orders higher in the execution time compared to the MCCS algorithm. The actual time can be much longer, as the upper bound on the 90% confidence interval spans five orders up due to the Poisson distribution of the probability to find the solution randomly. For each $\Gamma$=N, 2N, 3N case considered herein, the average fidelity expected from the benchmark batch of circuits using the associated infidelities $E_+$ used previously is estimated. It is found that it would take more than twice the number of calibrated gates to reach the same average fidelities if the naive approach is used. The advantage in the $\Gamma$ requirement grows with the system size according to the trends shown in FIG. 12B. It should be noted to reach the same fidelity, the naive approach can demand as large as 80 additional calibrations, on top of 60 already required from the better-performing MCCS algorithm, for the 20-qubit instance.

III. D. Discussion

In the embodiments described herein, methods for minimizing calibration resource for a batch of quantum circuits are provided. It has been shown for both non-weighted and weighted graphs, optimizing mapping between logical qubits and physical qubits which are described by the graphs can have a significant impact on the fidelity. In both cases, the methods described herein to compute the mapping provide increase in the average algorithm fidelity from about 70% for unmapped executions, to over 90%. Calibrating the gate-sets using the backtracking algorithm gives a consistently better performance over the fidelity range of interest with high fidelity for both weighted and non-weighted graphs than the naive approach of calibrating the most frequently used gates. In both cases, the genetic algorithm performs well for a large calibration budget $\Gamma$>15. It should be noted that, aided by the remapping algorithm described herein, even a random calibration set can give a performance close to the one obtained using the backtracking algorithm or the genetic algorithm. It should also be noted that a random sampling method takes more than orders of magnitude as much time as the backtracking algorithm to reach a target fidelity.

In using the genetic algorithm to find the optimal calibration sequence, the genetic algorithm has been found to outperform the MCCS algorithm in terms of the average fidelity for a large target budget F. However, it should be noted that the genetic algorithm, which rely on stochastic evolution of an ensemble of candidate solution, tend to consume significant time and computational resource. Other neral-network based methods, such as deep learning, may be used to shoren the time. A more efficient fusion with other search methods, such as backtrack or nested candidate approches, may further be used to reduce the computational resource requirement.

The methods described herein may provide benefits in quantum circuit compiling and executing quantum algorithms that may accelerate various numerical optimization problems. Furthremore, the methods described herein may allow a smaller-sized quantum computer to optimize the calibration routine for a larger quantum computer.

It should be noted that the particular example embodiments described above are just some possible examples of application of calibration resource optimization to a quantum computing system according to the present disclosure and do not limit the possible configurations, specifications, or the like of quantum computing systems according to the present disclosure. For example, a quantum processor within a quantum computing system is not limited to a group of trapped ions with all-to-all connectivity described above. For example, a quantum processor may be architectures with a more restrictive connectivity, such as superconducting qubits and modularized topologies, where several strongly-connected modules communicate with a few channels. The graph theoretic technique provided herein can be modified to reduce the routing and shuttling time in such systems with limited connectivity.

While the foregoing is directed to specific embodiments, other and further embodiments may be devised without departing from the basic scope thereof, and the scope thereof is determined by the claims that follow.

The invention claimed is:

1. A method of performing a quantum computation process, comprising:
mapping, by a classical computer, a plurality of logical qubits to a plurality of physical qubits of a quantum processor so that a plurality of quantum circuits are executable using the physical qubits of the quantum processor, wherein
each of the physical qubits comprise a trapped ion, and
each of the plurality of quantum circuits comprises a plurality of single-qubit gates and a plurality of two-qubit gates among the plurality of the logical qubits;
adjusting, by a system controller, an amplitude and a frequency of a laser pulse to be applied to each of a first plurality of pairs of physical qubits to correct errors in two-qubit gates a among the first plurality of pairs of physical qubits;
executing the plurality of quantum circuits on the quantum processor, by applying laser pulses that each cause a single-qubit gate operation and a two-qubit gate operation in each of the plurality of quantum circuits on the plurality of physical qubits;
measuring, by the system controller, population of qubit states of the physical qubits in the quantum processor after executing the plurality of quantum circuits on the quantum processor; and
outputting, by the classical computer, the measured population of qubit states of the physical qubits as a result of the execution the plurality of quantum circuits, wherein the result of the execution the plurality of quantum circuits are configured to be displayed on a user interface, stored in a memory of the classical computer, or transferred to another computational device.

2. The method of claim 1, further comprising:
measuring, by the system controller, population of qubit states of the first plurality of pairs of physical qubits prior to the executing of the plurality of quantum circuits on the quantum processor.

3. The method of claim 1, further comprising:
computing, by the classical computer, a plurality of circuit graphs based on the plurality of quantum circuits, each having a plurality of vertices representing the plurality of logical qubits and a plurality of edges each representing a two-qubit gate between pairs of the plurality of logical qubits.

4. The method of claim 3, further comprising:
computing, by the classical computer, a most compact cumulative supergraph of the plurality of circuit graphs; and
computing, by the classical computer, the first plurality of pairs of physical qubits based on the computed most compact cumulative supergraph of the plurality of circuit graphs.

5. The method of claim 3, further comprising:
replacing, by the classical computer, one of a second plurality of circuit graphs with one of a third plurality of circuit graphs with a predetermined rate, wherein the plurality of circuit graphs comprises the second plurality of circuit graphs and the third plurality of circuit graphs;
generating, by the classical computer, a pair of circuit graphs to add to the second plurality of circuit graphs, based on a pair of the second plurality of circuit graphs;
computing, by the classical computer, a most compact cumulative supergraph of the plurality of circuit graphs; and
computing, by the classical computer, the first plurality of pairs of physical qubits based on the computed most compact cumulative supergraph comprising the second plurality of circuit graphs.

6. The method of claim 1, wherein the number of the first plurality of pairs of physical qubits is less than a predetermined calibration budget.

7. A quantum computing system, comprising:
a quantum processor comprising a plurality of physical qubits, wherein each of the physical qubits comprises a trapped ion;
a classical computer configured to:
map a plurality of logical qubits to the plurality of physical qubits so that a plurality of quantum circuits are executable using the physical qubits, wherein each of the plurality of quantum circuits comprises a plurality of single-qubit gates and a plurality of two-qubit gates among the plurality of the logical qubits; and
a system controller configured to:
adjust an amplitude and a frequency of a laser pulse to be applied to each of a first plurality of pairs of physical qubits to correct errors in two-qubit gates among a first plurality of pairs of physical qubits;
executing the plurality of quantum circuits on the quantum processor, by applying laser pulses that each cause a single-qubit gate operation and a two-qubit gate operation in each of the plurality of quantum circuits on the plurality of physical qubits; and
measure population of qubit states of the physical qubits in the quantum processor after executing the plurality of quantum circuits on the quantum processor, wherein
the classical computer is further configured to:
output the measured population of qubit states of the physical qubits as a result of the execution the plurality of quantum circuits, wherein the result of the execution the plurality of quantum circuits are configured to be displayed on a user interface, stored in a memory of the classical computer, or transferred to another computational device.

8. The quantum computing system of claim 7, wherein
the adjusting the amplitude and the frequency of the laser pulse comprises:
measuring, by the system controller, population of qubit states of the first plurality of pairs of physical qubits; and
adjusting, by the system controller, an amplitude and a frequency of a laser pulse to be applied to each of the first plurality of pairs of physical qubits to correct errors in the measured population of qubit states of the first plurality of pairs of physical qubits.

9. The quantum computing system of claim 7, wherein the classical computer is further configured to:
compute a plurality of circuit graphs based on the plurality of quantum circuits, each having a plurality of vertices representing the plurality of logical qubits and a plurality of edges each representing a two-qubit gate between pairs of the plurality of logical qubits.

10. The quantum computing system of claim 9, wherein the classical computer is further configured to:
compute a most compact cumulative supergraph of the plurality of circuit graphs; and
compute the first plurality of pairs of physical qubits based on the computed most compact cumulative supergraph of the plurality of circuit graphs.

11. The quantum computing system of claim 9, wherein the classical computer is further configured to:
replace one of a second plurality of circuit graphs with one of a third plurality of circuit graphs with a predetermined rate, wherein the plurality of circuit graphs comprises the second plurality of circuit graphs and the third plurality of circuit graphs;
generate a pair of circuit graphs to add to the second plurality of circuit graphs, based on a pair of the second plurality of circuit graphs;
compute, by the classical computer, a most compact cumulative supergraph of the plurality of circuit graphs; and
compute the first plurality of pairs of physical qubits based on the computed most compact cumulative supergraph comprising the second plurality of circuit graphs.

12. The quantum computing system of claim 7, wherein the number of the first plurality of pairs of physical qubits is less than a predetermined calibration budget.

13. The quantum computing system according to claim 7, wherein
each of the physical qubits is an ion having a nuclear spin and an electron spin such that a difference between the nuclear spin and the electron spin is zero.

14. The quantum computing system according to claim 13, wherein
each of the physical qubits is an ion having a nuclear spin ½ and the $^2S_{1/2}$ hyperfine states.

15. A quantum computing system comprising non-volatile memory having a number of instructions stored therein which, when executed by one or more processors, causes the quantum computing system to perform operations comprising:
mapping, by a classical computer, a plurality of logical qubits to a plurality of physical qubits of a quantum processor so that a plurality of quantum circuits are executable using the physical qubits of the quantum processor, wherein
each of the physical qubits comprise a trapped ion, and
each of the plurality of quantum circuits comprises a plurality of single-qubit gates and a plurality of two-qubit gates among the plurality of the logical qubits;
adjusting, by a system controller, an amplitude and a frequency of a laser pulse to be applied to each of a first plurality of pairs of physical qubits to correct errors in two-qubit gates among the first plurality of pairs of physical qubits;
executing the plurality of quantum circuits on the quantum processor, by applying laser pulses that each cause a single-qubit gate operation and a two-qubit gate operation in each of the plurality of quantum circuits on the plurality of physical qubits;
measuring, by the system controller, population of qubit states of the physical qubits in the quantum processor after executing the plurality of quantum circuits on the quantum processor; and
outputting, by the classical computer, the measured population of qubit states of the physical qubits as a result of the execution the plurality of quantum circuits, wherein the result of the execution the plurality of quantum circuits are configured to be displayed on a user interface, stored in a memory of the classical computer, or transferred to another computational device.

16. The quantum computing system of claim 15, wherein the operations further comprises:
measuring, by the system controller, population of qubit states of the first plurality of pairs of physical qubits prior to the executing of the plurality of quantum circuits on the quantum processor.

17. The quantum computing system of claim 15, further comprising:
computing, by the classical computer, a plurality of circuit graphs based on the plurality of quantum circuits, each having a plurality of vertices representing the plurality of logical qubits and a plurality of edges each representing a two-qubit gate between pairs of the plurality of logical qubits.

18. The quantum computing system of claim 17 further comprising:
computing, by the classical computer, a most compact cumulative supergraph of the plurality of circuit graphs; and
computing, by the classical computer, the first plurality of pairs of physical qubits based on the computed most compact cumulative supergraph of the plurality of circuit graphs.

19. The quantum computing system of claim 15, further comprising:
replacing, by the classical computer, one of a second plurality of circuit graphs with one of a third plurality of circuit graphs with a predetermined rate, wherein the plurality of circuit graphs comprises the second plurality of circuit graphs and the third plurality of circuit graphs;
generating, by the classical computer, a pair of circuit graphs to add to the second plurality of circuit graphs, based on a pair of the second plurality of circuit graphs;
computing, by the classical computer, a most compact cumulative supergraph of the plurality of circuit graphs; and computing, by the classical computer, the first plurality of pairs of physical qubits based on the computed most compact cumulative supergraph comprising the second plurality of circuit graphs.

20. The quantum computing system of claim 13, wherein the number of the first plurality of pairs of physical qubits is less than a predetermined calibration budget.

* * * * *